US012707378B2

(12) United States Patent
Nagano et al.

(10) Patent No.: US 12,707,378 B2
(45) Date of Patent: Aug. 11, 2026

(54) TERMINAL, BASE STATION AND WIRELESS COMMUNICATION METHOD

(71) Applicants: DENSO CORPORATION, Kariya-city (JP); TOYOTA JIDOSHA KABUSHIKI KAISHA, Toyota (JP)

(72) Inventors: Tatsuki Nagano, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 320 days.

(21) Appl. No.: 18/474,075

(22) Filed: Sep. 25, 2023

(65) Prior Publication Data

US 2024/0015641 A1 Jan. 11, 2024

Related U.S. Application Data

(63) Continuation of application No. PCT/JP2022/012188, filed on Mar. 17, 2022.

(30) Foreign Application Priority Data

Mar. 29, 2021 (JP) ................................ 2021-055161

(51) Int. Cl.
*H04W 48/16* (2009.01)
*H04W 36/30* (2009.01)

(52) U.S. Cl.
CPC ........... *H04W 48/16* (2013.01); *H04W 36/30* (2013.01)

(58) Field of Classification Search
CPC .................................................... H04W 48/16
USPC ......................................................... 455/434
See application file for complete search history.

(56) References Cited

U.S. PATENT DOCUMENTS

2020/0280899 A1* 9/2020 Zhang .................. H04W 48/10
2020/0344822 A1* 10/2020 Shi ........................ H04W 76/10
2023/0370914 A1* 11/2023 Kim ................. H04W 36/0077

FOREIGN PATENT DOCUMENTS

JP 2021503796 A 2/2021
KR 20200107996 A 9/2020
WO WO-2019136605 A1 7/2019

OTHER PUBLICATIONS

3GPP TS 36.304 V16.3.0 (Dec. 2020), Technical Specification, "3rd Generation Partnership Project; Technical Specification Group Radio Access Network; Evolved Universal Terrestrial Radio Access (E-UTRA); User Equipment (UE) procedures in idle mode (Release 16)" pp. 1-64.

(Continued)

*Primary Examiner* — Qutbuddin Ghulamali
(74) *Attorney, Agent, or Firm* — Harness, Dickey & Pierce, PLC

(57) ABSTRACT

A terminal includes: a receiving unit which receives system information including information indicating a minimum reception level in a cell; and a control unit which controls cell selection and/or cell reselection based on a reception level value derived based on the information used for indicating the minimum reception level and a value for a terminal with a specific number of receivers to the minimum reception level, wherein the value for the terminal with the specific number of receivers to the minimum reception level is a predetermined value for a terminal with a single receiver.

15 Claims, 15 Drawing Sheets

(56) References Cited

OTHER PUBLICATIONS

Fujitsu, "Cell Reselection of RedCap UE", Document R2-2100755, 3GPP TSG-RAN WG2 Meeting #113-e, Jan. 25-Feb. 5, 2021.
Nokia et al., "Higher Layer Support of Reduced Capability NR Devices", Document R1-2100500, 3GPP TSG-RAN WG1 Meeting #104-e, Jan. 25-Feb. 5, 2021.
U.S. Appl. No. 18/473,753, filed Sep. 25, 2023, Nagano et al.
3GPP TS 38.300 V15.2.0, 3rd Generation Partnership Project; Technical Specification Group Radio Access Network; NR; NR and NG-RAN Overall Description; Stage 2 (Release 15) (2018-06).
Qualcomm Incorporated, Impact of reduced capabilities on upper-layer procedures, 3GPP TSG RAN WG2 #113-e R2-2100311, Jan. 15, 2021.
"Coverage Evaluation for 5G Reduced Capability New Radio (NR-RedCap)," S. Moloudi, et al., Date of Publication: Mar. 15, 2021, DOI:10.1109/ACCESS.2021.3066036.

* cited by examiner

Fig. 1

CORE NETWORK

BASE STATION

UL SIGNAL

DL SIGNAL

Figure 2:
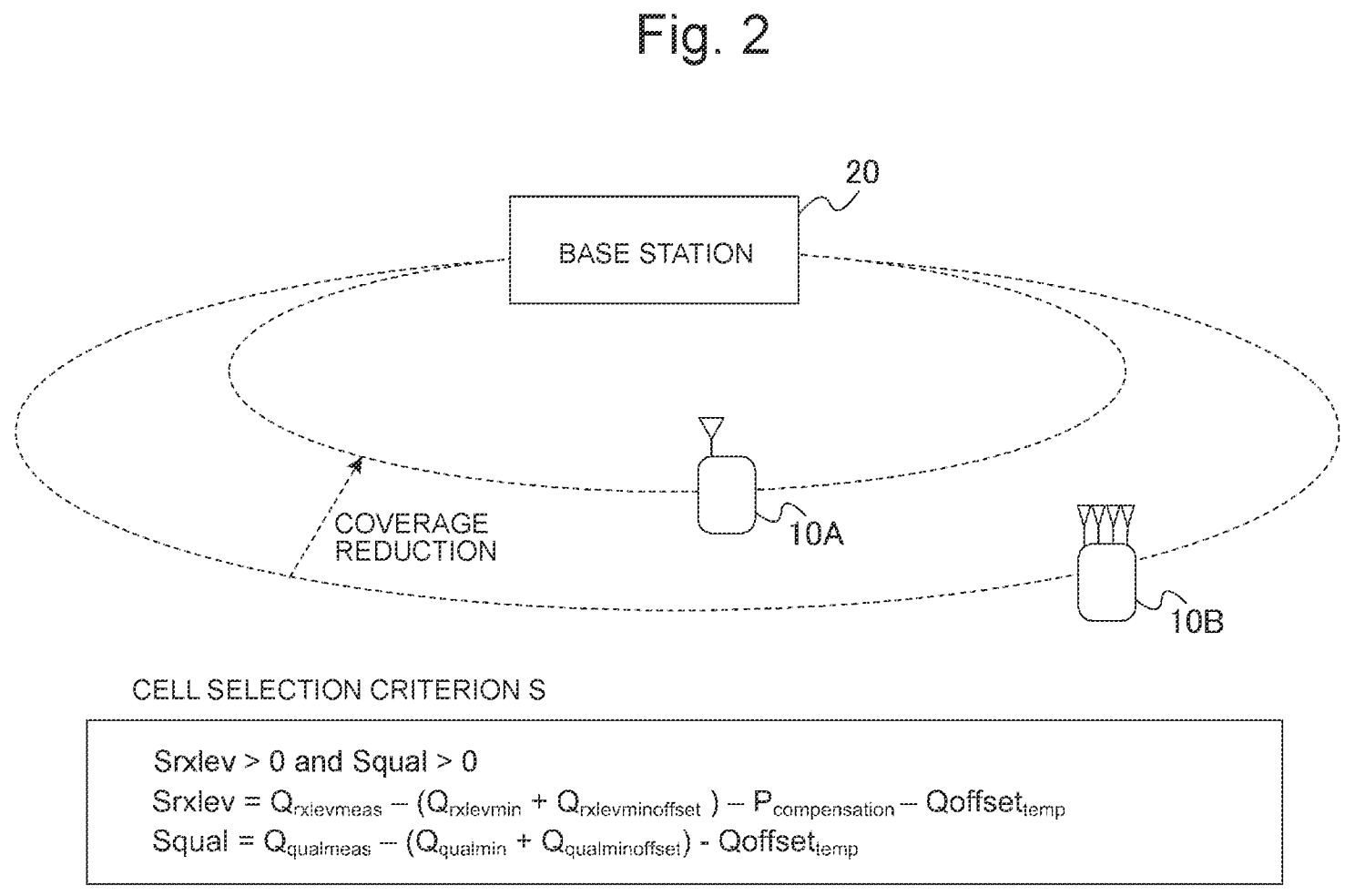

BASE STATION

10A

10B

COVERAGE REDUCTION

CELL SELECTION CRITERION S

Srxlev > 0 and Squal > 0

$Srxlev = Q_{rxlevmeas} - (Q_{rxlevmin} + Q_{rxlevminoffset}) - P_{compensation} - Qoffset_{temp}$ $Squal = Q_{qualmeas} - (Q_{qualmin} + Q_{qualminoffset}) - Qoffset_{temp}$

Fig. 3

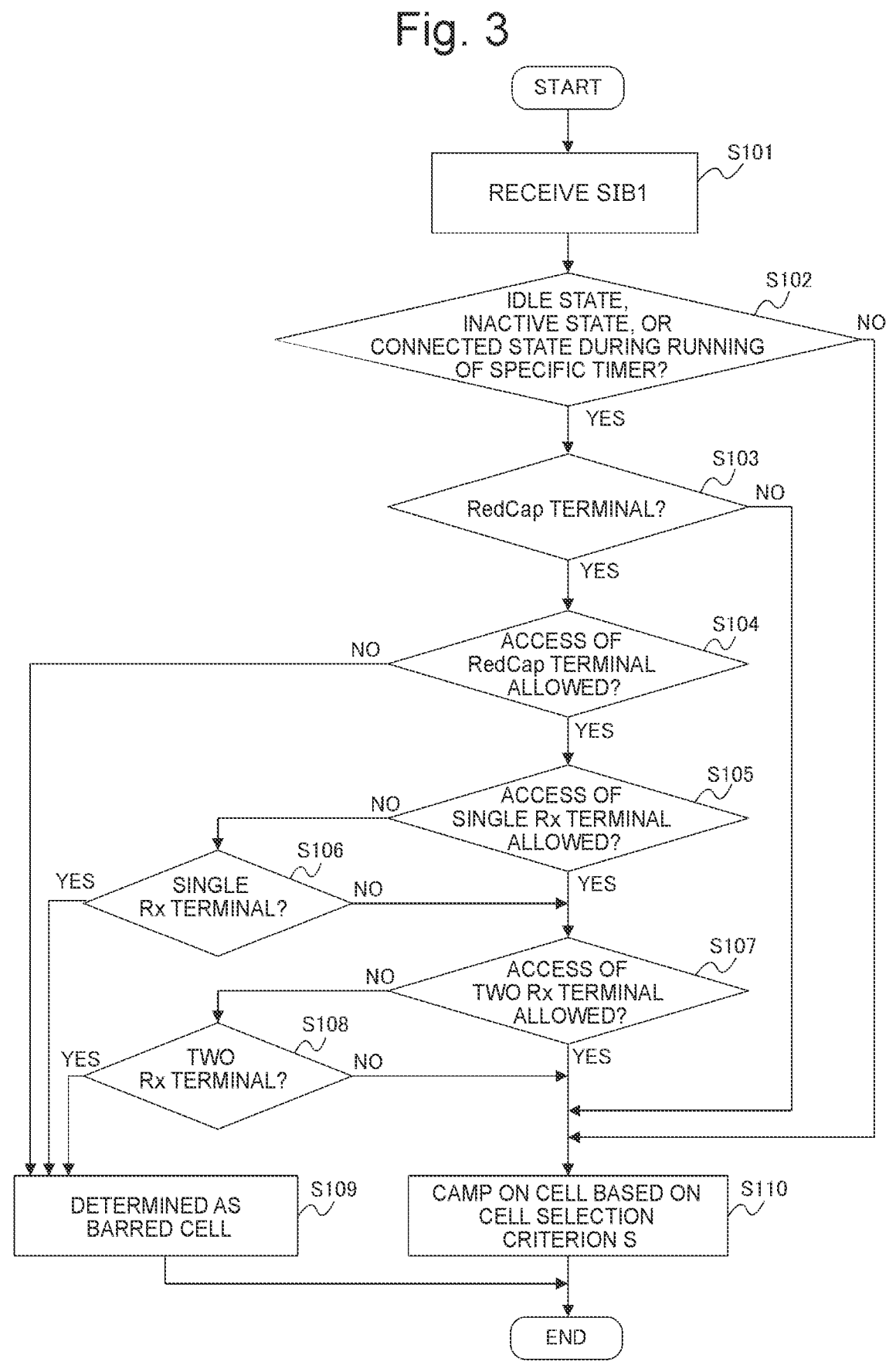

START

S101 RECEIVE SIB1

S102 IDLE STATE, INACTIVE STATE, OR CONNECTED STATE DURING RUNNING OF SPECIFIC TIMER?

NO

YES

S103 RedCap TERMINAL?

NO

YES

S104 ACCESS OF RedCap TERMINAL ALLOWED?

NO

YES

S105 ACCESS OF SINGLE Rx TERMINAL ALLOWED?

NO

YES

S106 SINGLE Rx TERMINAL?

YES

NO

S107 ACCESS OF TWO Rx TERMINAL ALLOWED?

NO

YES

S108 TWO Rx TERMINAL?

YES

NO

S109 DETERMINED AS BARRED CELL

S110 CAMP ON CELL BASED ON CELL SELECTION CRITERION S

END

Fig. 4

TS38.331 SIB1 message

```
-- ASN1START
-- TAG-SIB1-START
SIB1 ::=          SEQUENCE {
    ...
    cellAccessRelatedInfo               CellAccessRelatedInfo,
...
}
...
-- TAG-SIB1-STOP
-- ASN1STOP
```

TS38.331 CellAccessRelatedInfo information element

```
-- ASN1START
-- TAG-CELLACCESSRELATEDINFO-START

CellAccessRelatedInfo    ::=          SEQUENCE {
    plmn-IdentityList                   PLMN-IdentityInfoList,
    cellReservedForOtherUse             ENUMERATED {true}           OPTIONAL,    -- Need R
    ...,
    [[
    cellReservedForFutureUse-r16        ENUMERATED {true}           OPTIONAL,    -- Need R
    npn-IdentityInfoList-r16            NPN-IdentityInfoList-r16    OPTIONAL     -- Need R
    ]]
    [[
    redCap-AccessAllowed-r17            ENUMERATED {true}           OPTIONAL,    -- Need S
    singleRx-AccessAllowed-r17          ENUMERATED {true}           OPTIONAL,    -- Cond RedCap
    twoRx-AccessAllowed-r17             ENUMERATED {true}           OPTIONAL,    -- Cond RedCap2
    ]]
}
-- TAG-CELLACCESSRELATEDINFO-STOP
-- ASN1STOP
```

| *CellAccessRelatedInfo field descriptions* |
|---|
| ***redCap-AccessAllowed***<br>This field indicates whether RedCap UEs can access the cell or barrd. |
| ***singleRx-AccessAllowed***<br>This field indicates whether RedCap UEs with a single receiver can access the cell or barred. |
| ***twoRx-AccessAllowed***<br>This field indicates whether RedCap UEs with a dual receiver can access the cell or barred. |

| Conditional Presence | Explanation |
|---|---|
| *RedCap* | This field is optionally present if *redCap-AccessAllowed* is set to true. Otherwise, it is absent, Need S. |
| *RedCap2* | This field is optionally present when a cell operates on the frequency band to which it is mandatory for a UE to support 4 Rx. Otherwise, it is absent, Need S. |

Fig. 5

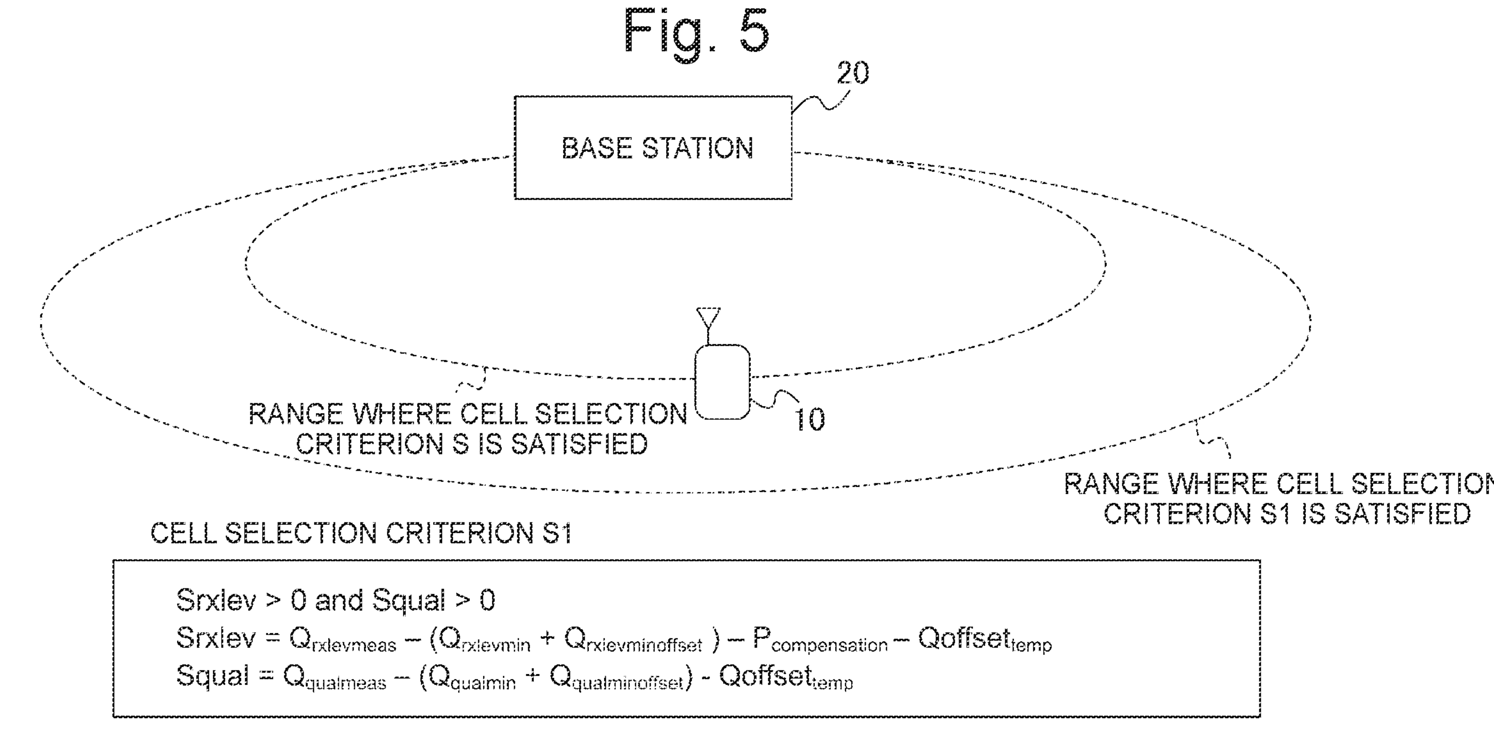

| | |
|---|---|
| $Q_{rxlevmin}$ | Minimum required RX level in the cell (dBm). If the UE supports SUL frequency for this cell, $Q_{rxlevmin}$ is obtained from *q-RxLevMinSUL*, if present, in *SIB1*, *SIB2* and *SIB4*, additionally, if $Q_{rxlevminoffsetcellSUL}$ is present in *SIB3* and *SIB4* for the concerned cell, this cell specific offset is added to the corresponding Qrxlevmin to achieve the required minimum RX level in the concerned cell;<br>else $Q_{rxlevmin}$ is obtained from *q-RxLevMin* in *SIB1*, *SIB2* and *SIB4*, additionally, if $Q_{rxlevminoffsetcell}$ is present in *SIB3* and *SIB4* for the concerned cell, this cell specific offset is added to the corresponding Qrxlevmin to achieve the required minimum RX level in the concerned cell.<br>**If the UE supports no more than a single receiver, $Q_{rxlevmin}$ is obatained from *q-RxLevMinSingleRx*, if present in *SIB1*, *SIB2* and *SIB4*, and both *redCap-AccessAllowed* and *singleRx-AccessAllowed* are set to true in *SIB1*.**<br>**If the UE supports no more than a dual receiver, $Q_{rxlevmin}$ is obatained from *q-RxLevMinTwoRx*, if present in *SIB1*, *SIB2* and *SIB4*, and both *redCap-AccessAllowed* and *twoRx-AccessAllowed* are set to true in *SIB1*.** |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell.<br>**If the UE supports no more than a single receiver, $Q_{qualmin}$ is obatained from *q-QualMinSingleRx*, if present in *SIB1*, *SIB2* and *SIB4*, and both *redCap-AccessAllowed* and *singleRx-AccessAllowed* are set to true in *SIB1*.**<br>**If the UE supports no more than a dual receiver, $Q_{qualmin}$ is obatained from *q-QualMinTwoRx*, if present in *SIB1*, *SIB2* and *SIB4*, and both *redCap-AccessAllowed* and *twoRx-AccessAllowed* are set to true in *SIB1*.** |

Fig. 6

TS38.331 SIB1 message

```
-- ASN1START
-- TAG-SIB1-START
SIB1 ::=          SEQUENCE {
    cellSelectionInfo                SEQUENCE {
        q-RxLevMin                       Q-RxLevMin,
        q-RxLevMinOffset                 INTEGER (1..8)       OPTIONAL,   -- Need S
        q-RxLevMinSUL                    Q-RxLevMin           OPTIONAL,   -- Need R
        q-QualMin                        Q-QualMin            OPTIONAL,   -- Need S
        q-QualMinOffset                  INTEGER (1..8)       OPTIONAL    -- Need S
    }                                                         OPTIONAL,   -- Cond Standalone
...
    nonCriticalExtension             SIB1-v1610-IEs           OPTIONAL
}
SIB1-v1610-IEs ::=           SEQUENCE {
    ...
    nonCriticalExtension             SIB1-v1630-IEs           OPTIONAL
}
SIB1-v1630-IEs ::=           SEQUENCE {
    ...
    nonCriticalExtension             SIB1-v17xy-Ies           OPTIONAL
}
SIB1-v17xy-IEs ::=          SEQUENCE {
    cellSelectionInfo-v17xy          SEQUENCE {
        q-RxLevMinSingleRx-r17           Q-RxLevMin           OPTIONAL,   -- Cond SingleRx
        q-QualMinSingleRx-r17            Q-QualMin            OPTIONAL    -- Cond SingleRx
        q-RxLevMinTwoRx-r17              Q-RxLevMin           OPTIONAL,   -- Cond TwoRx
        q-QualMinTwoRx-r17               Q-QualMin            OPTIONAL    -- Cond TwoRx
    }                                                         OPTIONAL,   -- Cond RedCap
  ...
-- TAG-SIB1-STOP
-- ASN1STOP
```

| *SIB1 field descriptions* |
|---|
| ***q-QualMinSingleRx***<br>Parameter "$Q_{qualmin}$" in TS 38.304 [20], applicable for serving cell, if the UE supports no more than a single receiver. If the field is absent, the single receiver UE applies the value indicated by *q-QualMin* for $Q_{qualmin}$. |
| ***q-QualMinTwoRx***<br>Parameter "$Q_{qualmin}$" in TS 38.304 [20], applicable for serving cell, if the UE supports no more than a dual receiver. If the field is absent, the dual receiver UE applies the value indicated by *q-QualMin* for $Q_{qualmin}$. |
| ***q-RxLevMinSingleRx***<br>Parameter "$Q_{rxlevmin}$" in TS 38.304 [20], applicable for serving cell, if the UE supports no more than a single receiver. If the field is absent, the single receiver UE applies the value indicated by *q-RxLevMin* for $Q_{rxlevmin}$. |
| ***q-RxLevMinTwoRx***<br>Parameter "$Q_{rxlevmin}$" in TS 38.304 [20], applicable for serving cell, if the UE supports no more than a dual receiver. If the field is absent, the dual receiver UE applies the value indicated by *q-RxLevMin* for $Q_{rxlevmin}$. |

| Conditional Presence | Explanation |
|---|---|
| *RedCap* | This field is optionally present if redCap-Access is set to true. Otherwise, it is absent, Need S. |
| *SingleRx* | The field is mandatory present in a cell, if *singleRx-AccessAllowed* is set to true in *SIB1*. Otherwise, it is absent, Need S. |
| *TwoRx* | The field is mandatory present in a cell, if twoRx-AccessAllowed is set to true in SIB1. Otherwise, it is absent, Need S. |

Fig. 7

TS38.331 SIB2 message

```
-- ASN1START
-- TAG-SIB2-START
SIB2 ::=        SEQUENCE {
    ...
    intraFreqCellReselectionInfo        SEQUENCE {
        q-RxLevMin                          Q-RxLevMin,
        q-RxLevMinSUL                       Q-RxLevMin                      OPTIONAL,   -- Need R
        q-QualMin                           Q-QualMin                       OPTIONAL,   -- Need S
        s-IntraSearchP                      ReselectionThreshold,
        s-IntraSearchQ                      ReselectionThresholdQ           OPTIONAL,   -- Need S
        t-ReselectionNR                     T-Reselection,
        frequencyBandList                   MultiFrequencyBandListNR-SIB    OPTIONAL,   -- Need S
        frequencyBandListSUL                MultiFrequencyBandListNR-SIB    OPTIONAL,   -- Need R
        p-Max                               P-Max                           OPTIONAL,   -- Need S
        smtc                                SSB-MTC                         OPTIONAL,   -- Need S
        ss-RSSI-Measurement                 SS-RSSI-Measurement             OPTIONAL,   -- Need R
        ssb-ToMeasure                       SSB-ToMeasure                   OPTIONAL,   -- Need S
        deriveSSB-IndexFromCell             BOOLEAN,
        ...,
        [[
        q-RxLevMinSingleRx-r17              Q-RxLevMin                      OPTIONAL,   -- Need S
        q-QualMinSingleRx-r17               Q-QualMin                       OPTIONAL,   -- Need S
        q-RxLevMinTwoRx-r17                 Q-RxLevMin                      OPTIONAL,   -- Need S
        q-QualMinTwoRx-r17                  Q-QualMin                       OPTIONAL    -- Need S
        ]]
    },
...
-- TAG-SIB2-STOP
-- ASN1STOP
```

| *SIB2 field descriptions* |
|---|
| ***q-QualMinSingleRx***<br>Parameter "$Q_{qualmin}$" in TS 38.304 [20], applicable for serving cell, if the UE supports no more than a single receiver. If the field is absent, the single receiver UE applies the value indicated by *q-QualMin* for $Q_{qualmin}$. |
| ***q-QualMinTwoRx***<br>Parameter "$Q_{qualmin}$" in TS 38.304 [20], applicable for serving cell, if the UE supports no more than a dual receiver. If the field is absent, the dual receiver UE applies the value indicated by *q-QualMin* for $Q_{qualmin}$. |
| ***q-RxLevMinSingleRx***<br>Parameter "$Q_{rxlevmin}$" in TS 38.304 [20], applicable for serving cell, if the UE supports no more than a single receiver. If the field is absent, the single receiver UE applies the value indicated by *q-RxLevMin* for $Q_{rxlevmin}$. |
| ***q-RxLevMinTwoRx***<br>Parameter "$Q_{rxlevmin}$" in TS 38.304 [20], applicable for serving cell, if the UE supports no more than a dual receiver. If the field is absent, the dual receiver UE applies the value indicated by *q-RxLevMin* for $Q_{rxlevmin}$. |

Fig. 8

TS38.331 SIB4 message

```
-- ASN1START
-- TAG-SIB4-START
SIB4 ::=        SEQUENCE {
    interFreqCarrierFreqList          InterFreqCarrierFreqList,
       ...,
    [[
    interFreqCarrierFreqList-v1610    InterFreqCarrierFreqList-v1610       OPTIONAL   -- Need R
    ]],
    [[
    interFreqCarrierFreqList-v17xy    InterFreqCarrierFreqList-v17xy       OPTIONAL   -- Need R
    ]]
}
InterFreqCarrierFreqList ::=        SEQUENCE (SIZE (1..maxFreq)) OF InterFreqCarrierFreqInfo
InterFreqCarrierFreqList-v1610 ::=  SEQUENCE (SIZE (1..maxFreq)) OF InterFreqCarrierFreqInfo-v1610
InterFreqCarrierFreqInfo ::=        SEQUENCE {
    ...
    q-RxLevMin                        Q-RxLevMin,
    q-RxLevMinSUL                     Q-RxLevMin                         OPTIONAL,   -- Need R
    q-QualMin                         Q-QualMin                          OPTIONAL,   -- Need S
        ...
}
InterFreqNeighCellList-v17xy ::=    SEQUENCE (SIZE (1..maxCellInter)) OF InterFreqNeighCellInfo-
v17xy
InterFreqNeighCellInfo ::=          SEQUENCE {
    physCellId                        PhysCellId,
    q-OffsetCell                      Q-OffsetRange,
    q-RxLevMinOffsetCell              INTEGER (1..8)                     OPTIONAL,   -- Need R
    q-RxLevMinOffsetCellSUL           INTEGER (1..8)                     OPTIONAL,   -- Need R
    q-QualMinOffsetCell               INTEGER (1..8)                     OPTIONAL,   -- Need R
    ...
}
...
InterFreqNeighCellInfo-v17xy ::=    SEQUENCE {
    q-RxLevMinSingleRx-r17            Q-RxLevMin                      OPTIONAL,      -- Need S
    q-QualMinSingleRx-r17             Q-QualMin                       OPTIONAL       -- Need S
    q-RxLevMinTwoRx-r17               Q-RxLevMin                      OPTIONAL,      -- Need S
    q-QualMinTwoRx-r17                Q-QualMin                       OPTIONAL       -- Need S
}
...
-- TAG-SIB4-STOP
-- ASN1STOP
```

| *SIB4 field descriptions* |
|---|
| ***q-QualMinSingleRx***<br>Parameter "$Q_{qualmin}$" in TS 38.304 [20], applicable for serving cell, if the UE supports no more than a single receiver. If the field is absent, the single receiver UE applies the value indicated by *q-QualMin* for $Q_{qualmin}$. |
| ***q-QualMinTwoRx***<br>Parameter "$Q_{qualmin}$" in TS 38.304 [20], applicable for serving cell, if the UE supports no more than a dual receiver. If the field is absent, the dual receiver UE applies the value indicated by *q-QualMin* for $Q_{qualmin}$. |
| ***q-RxLevMinSingleRx***<br>Parameter "$Q_{rxlevmin}$" in TS 38.304 [20], applicable for serving cell, if the UE supports no more than a single receiver. If the field is absent, the single receiver UE applies the value indicated by *q-RxLevMin* for $Q_{rxlevmin}$. |
| ***q-RxLevMinTwoRx***<br>Parameter "$Q_{rxlevmin}$" in TS 38.304 [20], applicable for serving cell, if the UE supports no more than a dual receiver. If the field is absent, the dual receiver UE applies the value indicated by *q-RxLevMin* for $Q_{rxlevmin}$. |

Fig. 9

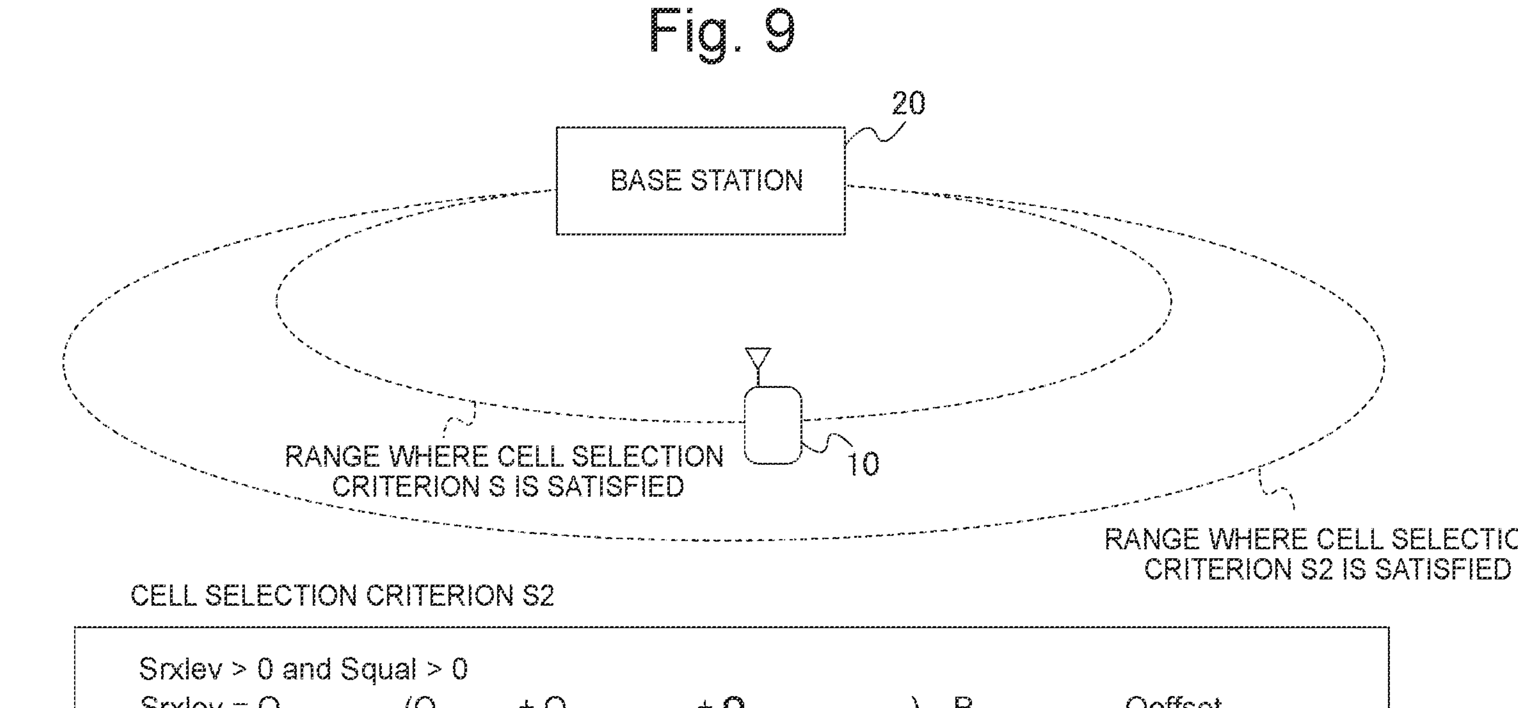

CELL SELECTION CRITERION S2

$$Srxlev > 0 \text{ and } Squal > 0$$

$$Srxlev = Q_{rxlevmeas} - (Q_{rxlevmin} + Q_{rxlevminoffset} + \underline{\mathbf{Q}_{\mathbf{rxlevminoffset,Rx}}}) - P_{compensation} - Qoffset_{temp}$$

$$Squal = Q_{qualmeas} - (Q_{qualmin} + Q_{qualminoffset} + \underline{\mathbf{Q}_{\mathbf{qualminoffset,Rx}}}) - Qoffset_{temp}$$

| | |
|---|---|
| $\mathbf{Q}_{\mathbf{rxlevminoffset,Rx}}$ | Offset to the signalled $Q_{rxlevmin}$ taken into account in the Srxlev evaluation for a UE supporting no more than a single receiver or no more than a dual receiver. In case of the single Rx, *q-RxLevMinOffsetSingleRx* is applied, whilst *q-RxLevMinOffsetTwoRx* is applied in case of the dual Rx. |
| $\mathbf{Q}_{\mathbf{qualminoffset,Rx}}$ | Offset to the signalled $Q_{qualmin}$ taken into account in the Squal evaluation for a UE supporting no more than a single receiver or no more than a dual receiver. In case of the single Rx, q-RxLevMinOffsetSingleRx is applied, whilst q-RxLevMinOffsetTwoRx is applied in case of the dual Rx. |

Fig. 10

TS38.331 SIB1 message

```
-- ASN1START
-- TAG-SIB1-START
SIB1 ::=          SEQUENCE {
    cellSelectionInfo                   SEQUENCE {
        q-RxLevMin                          Q-RxLevMin,
        q-RxLevMinOffset                    INTEGER (1..8)          OPTIONAL,    -- Need S
        q-RxLevMinSUL                       Q-RxLevMin              OPTIONAL,    -- Need R
        q-QualMin                           Q-QualMin               OPTIONAL,    -- Need S
        q-QualMinOffset                     INTEGER (1..8)          OPTIONAL     -- Need S
    }                                                               OPTIONAL,    -- Cond Standalone
...
    nonCriticalExtension                SIB1-v1610-IEs              OPTIONAL
}
SIB1-v1610-IEs ::=               SEQUENCE {
    ...
    nonCriticalExtension              SIB1-v1630-IEs                OPTIONAL
}
SIB1-v1630-IEs ::=               SEQUENCE {
    ...
    nonCriticalExtension            SIB1-v17xy-Ies                  OPTIONAL
}
SIB1-v17xy-IEs ::=              SEQUENCE {
    cellSelectionInfo-v17xy         SEQUENCE {
        q-RxLevMinOffsetSingleRx-r17        INTEGER (1..8)          OPTIONAL,    -- Cond SingleRx
        q-QualMinOffsetSingleRx-r17         INTEGER (1..8)          OPTIONAL,    -- Cond SingleRx
        q-RxLevMinOffsetTwoRx-r17           INTEGER (1..8)          OPTIONAL,    -- Cond TwoRx
        q-QualMinOffsetTwoRx-r17            INTEGER (1..8)          OPTIONAL     -- Cond TwoRx
    }                                                               OPTIONAL,    -- Cond RedCap
  ...
-- TAG-SIB1-STOP
-- ASN1STOP
```

| *SIB1 field descriptions* |
|---|
| ***q-QualMinOffsetSingleRx***<br>Parameter "$Q_{qualminoffset,Rx}$" in TS 38.304 [20], applicable for serving cell, if the UE supports no more than a single receiver. Actual value $Q_{qualminoffset,Rx}$ = field value [dB]. If the field is absent, the UE applies the (default) value of 0 dB for $Q_{qualminoffset,Rx}$. |
| ***q-QualMinOffsetTwoRx***<br>Parameter "$Q_{qualminoffset,Rx}$" in TS 38.304 [20], applicable for serving cell, if the UE supports no more than a dual receiver. Actual value $Q_{qualminoffset,Rx}$ = field value [dB]. If the field is absent, the UE applies the (default) value of 0 dB for $Q_{qualminoffset,Rx}$. |
| ***q-RxLevMinOffsetSingleRx***<br>Parameter "$Q_{rxlevminoffset,Rx}$" in TS 38.304 [20], applicable for serving cell, if the UE supports no more than a single receiver. Actual value $Q_{rxlevminoffset,Rx}$ = field value [dB]. If the field is absent, the UE applies the (default) value of 0 dB for $Q_{rxlevminoffset,Rx}$. |
| ***q-RxLevMinOffsetTwoRx***<br>Parameter "$Q_{rxlevminoffset,Rx}$" in TS 38.304 [20], applicable for serving cell, if the UE supports no more than a dual receiver. Actual value $Q_{rxlevminoffset,Rx}$ = field value [dB]. If the field is absent, the UE applies the (default) value of 0 dB for $Q_{rxlevminoffset,Rx}$. |

| Conditional Presence | Explanation |
|---|---|
| *RedCap* | This field is optionally present if redCap-Access is set to true. Otherwise, it is absent, Need S. |
| *SingleRx* | The field is mandatory present in a cell, if *singleRx-AccessAllowed* is set to true in *SIB1*. Otherwise, it is absent, Need S. |
| *TwoRx* | The field is mandatory present in a cell, if twoRx-AccessAllowed is set to true in SIB1. Otherwise, it is absent, Need S. |

Fig. 11

TS38.331 SIB2 message

```
-- ASN1START
-- TAG-SIB2-START
SIB2 ::=        SEQUENCE {
    ...
    intraFreqCellReselectionInfo        SEQUENCE {
        q-RxLevMin                          Q-RxLevMin,
        q-RxLevMinSUL                       Q-RxLevMin                  OPTIONAL,   -- Need R
        q-QualMin                           Q-QualMin                   OPTIONAL,   -- Need S
        s-IntraSearchP                      ReselectionThreshold,
        s-IntraSearchQ                      ReselectionThresholdQ       OPTIONAL,   -- Need S
        t-ReselectionNR                     T-Reselection,
        frequencyBandList                   MultiFrequencyBandListNR-SIB    OPTIONAL,   -- Need S
        frequencyBandListSUL                MultiFrequencyBandListNR-SIB    OPTIONAL,   -- Need R
        p-Max                               P-Max                       OPTIONAL,   -- Need S
        smtc                                SSB-MTC                     OPTIONAL,   -- Need S
        ss-RSSI-Measurement                 SS-RSSI-Measurement         OPTIONAL,   -- Need R
        ssb-ToMeasure                       SSB-ToMeasure               OPTIONAL,   -- Need S
        deriveSSB-IndexFromCell             BOOLEAN,
        ...,
        [[
        q-RxLevMinOffsetSingleRx-r17        INTEGER (1..8)              OPTIONAL,   -- Need S
        q-QualMinOffsetSingleRx-r17         INTEGER (1..8)              OPTIONAL,   -- Need S
        q-RxLevMinOffsetTwoRx-r17           INTEGER (1..8)              OPTIONAL,   -- Need S
        q-QualMinOffsetTwoRx-r17            INTEGER (1..8)              OPTIONAL    -- Need S
        ]]
    },
...
-- TAG-SIB2-STOP
-- ASN1STOP
```

| *SIB2 field descriptions* |
| --- |
| ***q-QualMinOffsetSingleRx***<br>Parameter "$Q_{qualminoffset,Rx}$" in TS 38.304 [20], applicable for serving cell, if the UE supports no more than a single receiver. Actual value $Q_{qualminoffset,Rx}$ = field value [dB]. If the field is absent, the UE applies the (default) value of 0 dB for $Q_{qualminoffset,Rx}$. |
| ***q-QualMinOffsetTwoRx***<br>Parameter "$Q_{qualminoffset,Rx}$" in TS 38.304 [20], applicable for serving cell, if the UE supports no more than a dual receiver. Actual value $Q_{qualminoffset,Rx}$ = field value [dB]. If the field is absent, the UE applies the (default) value of 0 dB for $Q_{qualminoffset,Rx}$. |
| ***q-RxLevMinOffsetSingleRx***<br>Parameter "$Q_{rxlevminoffset,Rx}$" in TS 38.304 [20], applicable for serving cell, if the UE supports no more than a single receiver. Actual value $Q_{rxlevminoffset,Rx}$ = field value [dB]. If the field is absent, the UE applies the (default) value of 0 dB for $Q_{rxlevminoffset,Rx}$. |
| ***q-RxLevMinOffsetTwoRx***<br>Parameter "$Q_{rxlevminoffset,Rx}$" in TS 38.304 [20], applicable for serving cell, if the UE supports no more than a dual receiver. Actual value $Q_{rxlevminoffset,Rx}$ = field value [dB]. If the field is absent, the UE applies the (default) value of 0 dB for $Q_{rxlevminoffset,Rx}$. |

Fig. 12

TS38.331 SIB4 message

```
-- ASN1START
-- TAG-SIB4-START
SIB4 ::=          SEQUENCE {
    interFreqCarrierFreqList          InterFreqCarrierFreqList,
        ...,
    [[
    interFreqCarrierFreqList-v1610    InterFreqCarrierFreqList-v1610    OPTIONAL   -- Need R
    ]],
    [[
    interFreqCarrierFreqList-v17xy    InterFreqCarrierFreqList-v17xy    OPTIONAL   -- Need R
    ]]
}
InterFreqCarrierFreqList ::=        SEQUENCE (SIZE (1..maxFreq)) OF InterFreqCarrierFreqInfo
InterFreqCarrierFreqList-v1610 ::=  SEQUENCE (SIZE (1..maxFreq)) OF InterFreqCarrierFreqInfo-v1610
InterFreqCarrierFreqInfo ::=        SEQUENCE {
    ...
    q-RxLevMin                      Q-RxLevMin,
    q-RxLevMinSUL                   Q-RxLevMin                  OPTIONAL,   -- Need R
    q-QualMin                       Q-QualMin                   OPTIONAL,   -- Need S
        ...
}
InterFreqNeighCellList-v17xy ::=    SEQUENCE (SIZE (1..maxCellInter)) OF InterFreqNeighCellInfo-
v17xy
InterFreqNeighCellInfo ::=          SEQUENCE {
    physCellId                      PhysCellId,
    q-OffsetCell                    Q-OffsetRange,
    q-RxLevMinOffsetCell            INTEGER (1..8)              OPTIONAL,   -- Need R
    q-RxLevMinOffsetCellSUL         INTEGER (1..8)              OPTIONAL,   -- Need R
    q-QualMinOffsetCell             INTEGER (1..8)              OPTIONAL,   -- Need R
    ...
}
...
InterFreqNeighCellInfo-v17xy ::=    SEQUENCE {
    q-RxLevMinOffsetSingleRx-r17    INTEGER (1..8)              OPTIONAL,   -- Need S
    q-QualMinOffsetSingleRx-r17     INTEGER (1..8)              OPTIONAL    -- Need S
    q-RxLevMinOffsetTwoRx-r17       INTEGER (1..8)              OPTIONAL,   -- Need S
    q-QualMinOffsetTwoRx-r17        INTEGER (1..8)              OPTIONAL    -- Need S
}
...
-- TAG-SIB4-STOP
-- ASN1STOP
```

| *SIB4 field descriptions* |
|---|
| ***q-QualMinOffsetSingleRx*** <br> Parameter "$Q_{qualminoffset,Rx}$" in TS 38.304 [20], applicable for serving cell, if the UE supports no more than a single receiver. Actual value $Q_{qualminoffset,Rx}$ = field value [dB]. If the field is absent, the UE applies the (default) value of 0 dB for $Q_{qualminoffset,Rx}$. |
| ***q-QualMinOffsetTwoRx*** <br> Parameter "$Q_{qualminoffset,Rx}$" in TS 38.304 [20], applicable for serving cell, if the UE supports no more than a dual receiver. Actual value $Q_{qualminoffset,Rx}$ = field value [dB]. If the field is absent, the UE applies the (default) value of 0 dB for $Q_{qualminoffset,Rx}$. |
| ***q-RxLevMinOffsetSingleRx*** <br> Parameter "$Q_{rxlevminoffset,Rx}$" in TS 38.304 [20], applicable for serving cell, if the UE supports no more than a single receiver. Actual value $Q_{rxlevminoffset,Rx}$ = field value [dB]. If the field is absent, the UE applies the (default) value of 0 dB for $Q_{rxlevminoffset,Rx}$. |
| ***q-RxLevMinOffsetTwoRx*** <br> Parameter "$Q_{rxlevminoffset,Rx}$" in TS 38.304 [20], applicable for serving cell, if the UE supports no more than a dual receiver. Actual value $Q_{rxlevminoffset,Rx}$ = field value [dB]. If the field is absent, the UE applies the (default) value of 0 dB for $Q_{rxlevminoffset,Rx}$. |

TERMINAL, BASE STATION AND WIRELESS COMMUNICATION METHOD

CROSS-REFERENCE TO RELATED APPLICATIONS

This application is a continuation application of International Patent Application No. PCT/JP2022/012188, filed Mar. 17, 2022, which designated the U.S. and claims the benefit of priority to Japanese Patent Application No. 2021-055161, filed Mar. 29, 2021. The entire disclosures of the above applications are incorporated herein by reference.

TECHNICAL FIELD

This disclosure relates to a terminal and a wireless communication method.

BACKGROUND

In the 3rd Generation Partnership Project (3GPP) as an international standards organization, New Radio (NR) Release 15 as the 5th generation (5G) RAT (Radio Access Technology) is specified as a successor to Long Term Evolution (LTE) as the 3.9th generation RAT and LTE-Advanced as the 4th generation RAT, for example, Non-Patent Document 1: 3GPP TS 38.300 V15.2.0 (2018-06). LTE and/or LTE-Advanced are also called Evolved Universal Terrestrial Radio Access (E-UTRA).

In E-UTRA and/or NR, cell selection to select a cell on which a terminal camps on and/or cell reselection to reselect the cell is performed.

SUMMARY

In 3GPP (for example, NR release 17), it is considered to support a terminal for NR (hereinafter referred to as "Reduced capability (RedCap) terminal") assuming performance and a price range lower than those of a terminal for NR (hereinafter referred to as "existing NR terminal") introduced in release 15 or 16. Further, it is also considered to define the RedCap terminal as a terminal of a specific type. Further, it is also considered to support a terminal with a specific number of antennas (for example, a terminal with a single or two receiving antennas) that is smaller than a given number of antennas (for example, four or two receiving antennas).

It is assumed that the coverage of the terminal of the specific type and/or with the specific number of antennas is reduced in comparison with the existing NR terminal and/or a terminal with more antennas than the specific number of antennas. Accordingly, the terminal of the specific type and/or with the specific number of antennas may not be able to appropriately select and/or reselect a cell on which the terminal camps, in cell selection and/or cell reselection.

One object of this disclosure is to provide a terminal and a wireless communication method each of which can control cell selection and/or cell reselection appropriately.

A terminal according to one aspect of this disclosure includes: a receiving unit which receives minimum reception level information related to a minimum reception level for a terminal with a specific number of antennas in a specific cell, and/or minimum quality level information related to a minimum quality level for the terminal with the specific number of antennas in the specific cell; and a control unit which controls cell selection and/or cell reselection based on a reception level parameter derived based on the minimum reception level information and/or a quality level parameter derived based on the minimum quality level information. Further, a terminal according to one aspect of this disclosure includes: a receiving unit which receives minimum reception level information related to a minimum reception level in a specific cell, and/or minimum quality level information related to a minimum quality level in the specific cell; and a control unit which controls cell selection and/or cell reselection based on a reception level parameter derived based on a minimum reception level derived based on the minimum reception level information, and an offset for a terminal with a specific number of antennas to the minimum reception level, and/or a quality level parameter derived based on a minimum quality level derived based on the minimum quality level information and an offset for the terminal with the specific number of antennas to the minimum quality level.

With one aspect of this disclosure, it is possible to control cell selection and/or cell reselection appropriately.

BRIEF DESCRIPTION OF DRAWINGS

FIG. 1 is a diagram illustrating an example of the overview of a wireless communication system according to the present embodiment.

FIG. 2 is a diagram illustrating an example of a reduction in the coverage of a terminal 10 of a specific type and/or with a specific number of antennas.

FIG. 3 is a diagram illustrating an example of a determination operation on access prohibition according to the present embodiment.

FIG. 4 is a diagram illustrating an example of specification changes in RedCap access information and single Rx access information according to the present embodiment.

FIG. 5 is a diagram illustrating an example of a cell selection criterion S1 according to the present embodiment.

FIG. 6 is a diagram illustrating an example of specification changes in the cell selection criterion S1 according to the present embodiment.

FIG. 7 is a diagram illustrating an example of specification changes in the cell selection criterion S1 according to the present embodiment.

FIG. 8 is a diagram illustrating an example of specification changes in the cell selection criterion S1 according to the present embodiment.

FIG. 9 is a diagram illustrating an example of a cell selection criterion S2 according to the present embodiment.

FIG. 10 is a diagram illustrating an example of specification changes in the cell selection criterion S2 according to the present embodiment.

FIG. 11 is a diagram illustrating an example of specification changes in the cell selection criterion S2 according to the present embodiment.

FIG. 12 is a diagram indicating an example of specification changes in the cell selection criterion S2 according to the present embodiment.

DETAILED DESCRIPTION

Figure 13:
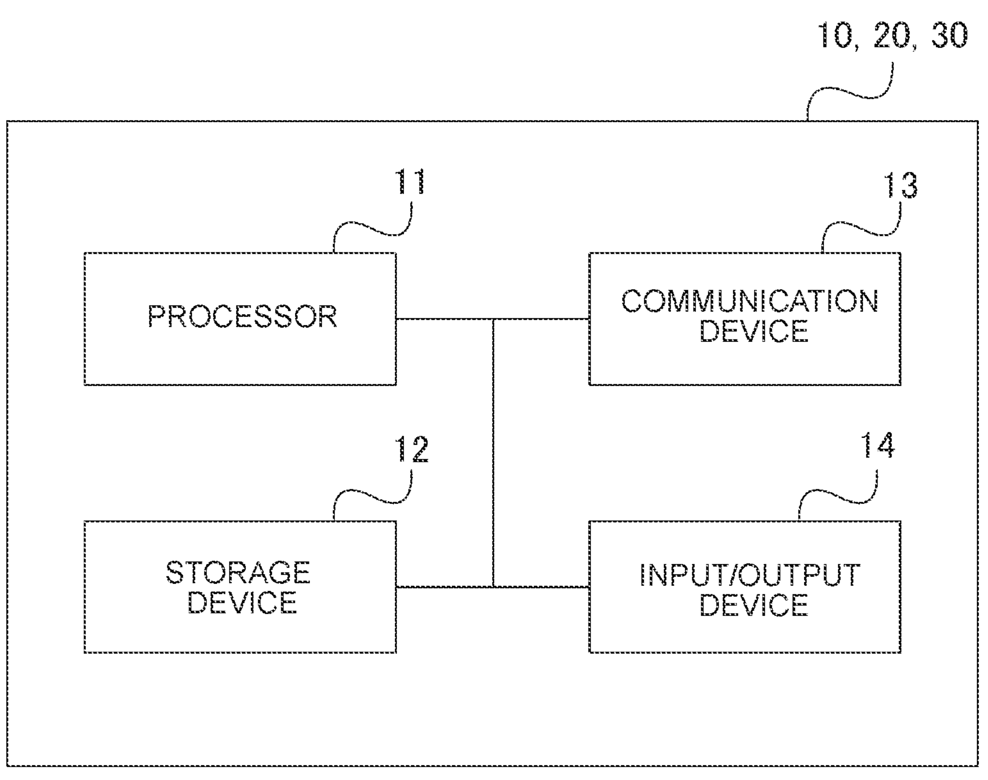
FIG. 13 is a diagram illustrating an example of the hardware configuration of each equipment in the wireless communication system according to the present embodiment.

An embodiment of this disclosure will be described with reference to the accompanying drawings. Note that, in each figure, members having the same reference sign have the same or similar configuration.

Figure 1:
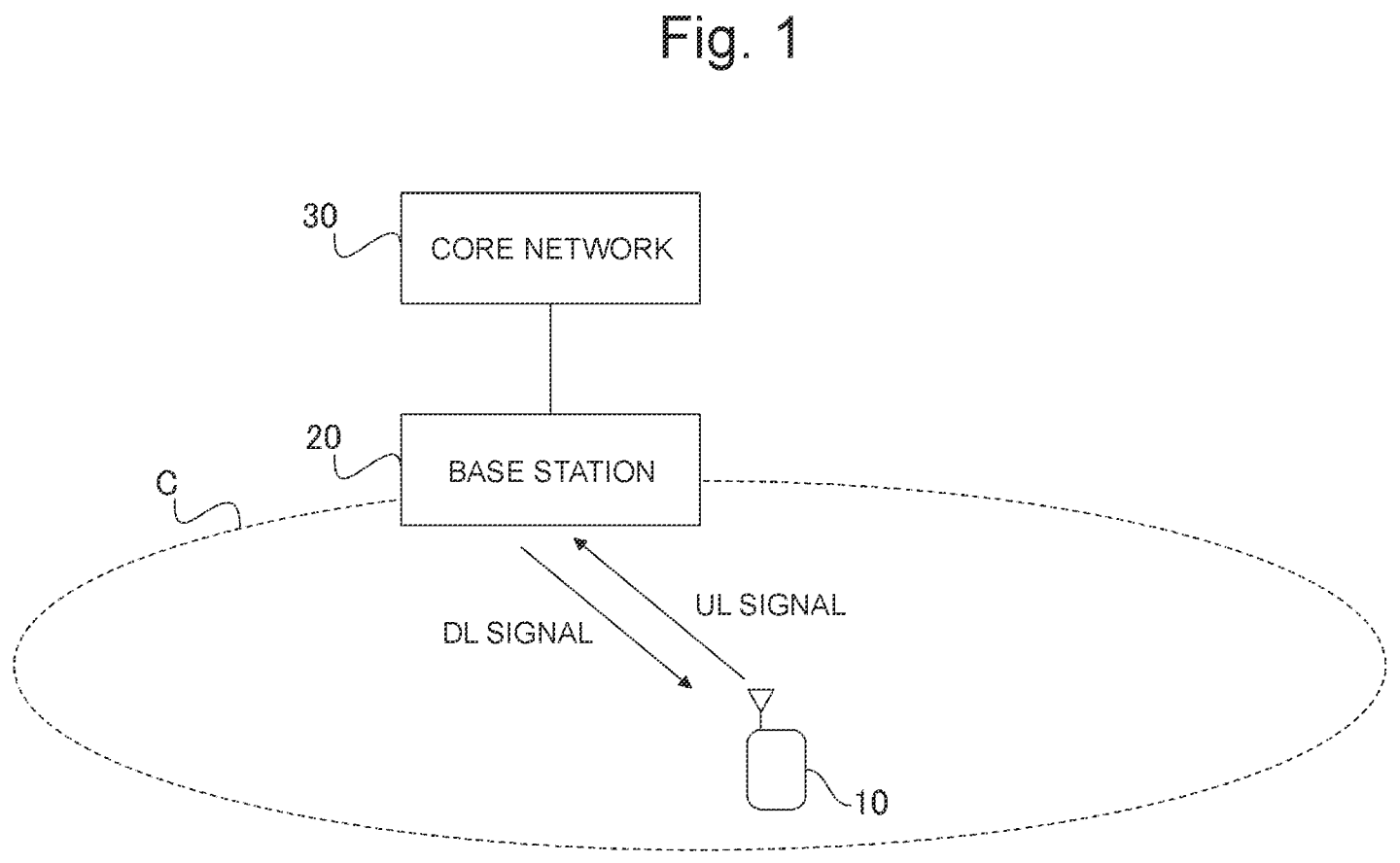

FIG. 1 is a diagram illustrating an example of the overview of a wireless communication system according to the present embodiment. As illustrated in FIG. 1, a wireless communication system 1 may include a terminal 10, a base station 20, and a core network 30. Note that the number of terminals 10 and base stations 20 illustrated in FIG. 1 is just an illustrative example, and the number is not limited to that illustrated.

As Radio Access Technology (RAT) of the wireless communication system 1, for example, NR is assumed, but it is not limited to NR, and various RATs such as the 6th generation (6G) RAT or later can be utilized.

The terminal 10 is a given terminal or equipment such as a smartphone, a personal computer, an in-vehicle terminal, an in-vehicle device, a stationary device, or a telematics control unit (TCU), for example. The terminal 10 may also be called User Equipment (UE), a Mobile Station (MS), a terminal (User Terminal), a radio apparatus, a subscriber terminal, an access terminal, or the like. The terminal 10 may be of a mobile type or a fixed type. The terminal 10 is configured communicably using NR as RAT, for example.

The base station 20 forms one or more cells C to communicate with the terminal 10 using each of the cells. The cell C may also be mutually rephrased as a serving cell, a carrier, a component carrier (CC), and the like. For example, the base station 20 may configure one primary cell and one or more secondary cells for the terminal 10 and communicate with the terminal 10 (also called carrier aggregation). That is, the one or more cells C include at least a primary cell and may include a secondary cell.

The base station 20 may also be called a gNodeB (gNB), an en-gNB, a Next Generation-Radio Access Network (NG-RAN) node, a low-power node, a Central Unit (CU), a Distributed Unit (DU), a gNB-DU, a Remote Radio Head (RRH), an Integrated Access and Backhaul/Backhauling (IAB) node, or the like. The base station 20 is not limited to one node and may be constituted by a plurality of nodes (for example, a combination of a lower node such as a DU and an upper node such as a CU).

The core network 30 is, for example, an NR-compatible core network (5G Core Network: 5GC), but the core network 30 is not limited thereto. A device on the core network 30 (hereinafter also be referred to as a "core network device") performs mobility management such as paging and location registration of the terminal 10. The core network device may be connected to the base station 20 through a given interface (for example, S1 or NG interface).

The core network device may include, for example, at least one of Access and Mobility Management Function (AMF) for managing C-plane information (e.g., information related to access, mobility management, and the like), and User Plane Function (UPF) for transmission control of U-plane information (e.g., user data).

In the wireless communication system 1, the terminal 10 receives a downlink (DL) signal from the base station 20 and/or transmits an uplink (UL) signal. One or more cells C are configured for the terminal 10, and at least one of the cells thus configured is activated. The maximum bandwidth of each cell is, for example, MHz, 400 MHz, or the like.

Further, the terminal 10 performs cell search based on a synchronization signal (e.g., Primary Synchronization Signal (PSS) and/or Secondary Synchronization Signal (PSS)) from the base station 20. The cell search is a procedure of the terminal 10 acquiring synchronization of time and frequency in a cell and detecting an identifier of the cell (e.g., a physical layer cell ID). A block including the synchronization signal, a broadcast channel (e.g., Physical Broadcast Channel: PBCH), and a Demodulation Reference Signal (DMRS) for the broadcast channel is also called a Synchronization Signal Block (SSB), a SS/PBCH block, or the like. The SSB is provided at a given cycle.

For example, the terminal 10 receives a Master Information Block (MIB) through the PBCH. The terminal 10 may determine whether or not the cell is a cell (hereinafter referred to as a barred cell) which the terminal 10 is barred from accessing, based on a parameter (e.g., "cellBarred") in the MIB. In a case where the cell is a barred cell, the terminal 10 may reselect other cells with the same carrier frequency as the barred cell. Note that the parameter may be called an Information Element (IE) or the like.

In the meantime, in a case where the cell is not a barred cell, the terminal may acquire a System Information Block (SIB) (e.g., SIBx, x=1, 2, . . . ) through a downlink shared channel (e.g., Physical Downlink Shared Channel (PDSCH)) based on the MIB. More specifically, the terminal 10 may determine a search space and/or a Control Resource Set (CORESET) based on a parameter (e.g., "pdcch-ConfigSIB1") in the MIB and perform monitoring of Downlink Control Information (DCI) in the search space associated with the CORESET. The monitoring of the DCI is also called blind decoding or the like. The terminal 10 receives SIB1 through the PDSCH scheduled by the DCI detected in the search space. The terminal 10 may receive SIBs (e.g., SIB2, SIB4, and the like) other than the SIB 1 through the PDSCH scheduled by the DCI. Note that system information may include an MIB and/or an SIB.

Here, the DCI may include DCI of one or more formats. DCI of a given format may be called a DCI format. A Cyclic Redundancy Check (CRC) bit (also called a CRC parity bit) scrambled by a given identifier (e.g., System Information radio network temporary identifier: SI-RNTI) may be attached to DCI used for scheduling of the PDSCH for transmitting the SIB (e.g., SIB1, SIB2 or SIB4). Further, the DCI may be, for example, a downlink assignment (e.g., a DCI format 1_0) used for scheduling of the PDSCH.

(Cell Selection/Reselection)

The terminal 10 in an idle state, an inactive state, or a connected state during running of a specific timer selects and/or reselects a cell (hereinafter referred to as "a camp-on cell" on which the terminal 10 camps, based on a given criterion (hereinafter referred to as "Cell Selection Criterion"). The camp-on cell may also be rephrased as a "serving cell," a "suitable cell," a "better cell," or the like, for example.

Here, the idle state is a state where a connection (hereinafter referred to as "RRC connection") of a RadioResource Control (RRC) layer between the terminal 10 and the base station 20 is not established and is also called RRC_IDLE, an idle mode, an RRC idle mode, and the like. The terminal 10 in the idle state receives system information broadcast in the camp-on cell. When the RRC connection is established, the terminal 10 in the idle state transitions to the connected state.

Further, the inactive state is a state where the RRC connection is established but is suspended and is also called an RRC_INACTIVE state, an inactive mode, an RRC inactive mode, and the like. The terminal 10 in the inactive state receives system information broadcast in the camp-on cell.

When the RRC connection is resumed, the terminal 10 in the inactive state transitions to the connected state, and when the RRC connection is released, the terminal 10 in the inactive state transitions to the idle state.

The connected state is a state where the RRC connection is established and is also called an RRC_CONNECTED state, a connected mode, an RRC connected mode, and the like. When the RRC connection is released, the terminal 10 in the connected state transitions to the idle state, and when the RRC connection is suspended, the terminal 10 in the connected state transitions to the inactive state.

In cell selection, the terminal 10 selects a camp-on cell based on a cell selection criterion S. For example, the terminal 10 may select, as the camp-on cell, a cell satisfying the cell selection criterion S from among strongest cells at respective carrier frequencies, searched by cell search. Note that the carrier frequency is identified by a given number (e.g., Absolute Radio Frequency Channel Number (ARFCN)) and can be rephrased as an RF reference frequency, an NR frequency, an EUTRA frequency, a center frequency, a channel raster, a frequency, and the like. One or more cells C may be provided in each carrier frequency.

In cell reselection, the terminal 10 reselects a cell better than the cell selected in the cell selection, based on the cell selection criterion S. In the cell reselection, a cell with the same carrier frequency (hereinafter referred to as "intra-frequency") as the camp-on cell and/or a carrier frequency (hereinafter referred to as "inter-frequency") different from the camp-on cell may be reselected, for example. Further, the terminal 10 may control the intra-frequency and/or the inter-frequency cell reselection based on information (hereinafter referred to as "priority information," e.g., "CellReselectionPriority" and/or "CellReselectionSubPriority") related to the priority of one or more carrier frequencies.

Next will be described the cell selection criterion S used in the cell selection and/or the cell reselection (hereinafter referred to as "cell selection/reselection"). The cell selection criterion S is a criterion based on a parameter (hereinafter referred to as "Srxlev") related to the reception level of a specific cell and/or a parameter (hereinafter referred to as "Squal") related to the quality level of the specific cell. Srxlev and Squal are also called a reception level parameter and a quality level parameter, respectively. As the cell selection criterion S, Srxlev and/or Squal may exceed a given value (e.g., 0), and the cell selection criterion S may be expressed by Formula 1 as follows, for example:

$$\text{Srxlev}>0 \text{ and } \text{Squal}>0$$

$$\text{Srxlev}=Q_{rxlevmeas}-(Q_{rxlevmin}+Q_{rxlevminoffset})-P_{compensation}-Q_{offsettemp}$$

$$\text{Squal}=Q_{qualmeas}-(Q_{qualmin}+Q_{qualminoffset})-Q_{offsettemp} \quad \text{Formula 1:}$$

As expressed by Formula 1, Srxlev may be derived based on at least one of the following parameters:

- A reception level (hereinafter referred to as "$Q_{rxlevmeas}$," e.g., Reference Signal Received Power (RSRP)) measured by the terminal 10 about the specific cell
- A minimum reception level (hereinafter referred to as "$Q_{rxlevmin}$") requested to the specific cell
- An offset (hereinafter referred to as "$Q_{rxlevminoffset}$") to $Q_{rxlevmin}$
- A compensation value (hereinafter referred to as "$P_{compensation}$") based on the maximum transmission power of the terminal 10
- A temporary offset (hereinafter referred to as "$Q_{offsettemp}$") applied to the specific cell Further, Squal may be derived based on at least one of the following parameters:

- A quality (hereinafter referred to as "$Q_{qualmeas}$," e.g., Reference Signal Received Quality (RSRQ)) measured by the terminal 10 about the specific cell
- A minimum quality level (hereinafter referred to as "$Q_{qualmin}$") requested to the specific cell
- An offset (hereinafter referred to as "$Q_{qualminoffset}$") to $Q_{qualmeas}$
- $Q_{offsettemp}$ Note that $P_{compensation}$ may be a given value or may be derived based on a value (at least one of "$P_{EMAX}$," "$P_{-}$," and "$P_{EMAX2}$") based on a maximum transmission power level of the terminal 10 and/or a maximum RF output class ("$P_{PowerClass}$") of the terminal 10. For example, within Frequency Range (FR) 1 (e.g., 410 MHz to 7125 MHz), $P_{compensation}$ may be calculated by Formula 2 as follows. Meanwhile, in FR 2 (e.g., 24250 MHz to 52600 MHz), $P_{compensation}$ may be set to 0 (zero).

$$\max(P_{EMAX1}-P_{PowerClass},0)-(\min(P_{EMAX2},P_{PowerClass})-\min(P_{EMAX1},P_{PowerClass}))(\text{dB}) \text{ or}$$

$$\max(P_{EMAX1}-P_{PowerClass},0)(\text{dB}) \quad \text{Formula 2:}$$

Note that information related to at least one of $Q_{rxlevmin}$, $Q_{rxlevminoffset}$, $Q_{offsettemp}$, $Q_{qualmin}$, and $Q_{qualminoffset}$ may be informed by system information. More specifically, the information related to at least one of $Q_{rxlevminoffset}$, $Q_{offsettemp}$, $Q_{-}$, and $Q_{qualminoffset}$ may be included in at least one of first system information (e.g., SIB1) used for cell selection, second system information (e.g., SIB2) used for intra-frequency cell reselection, and third system information (e.g., SIB4) used for inter-frequency cell reselection. The following description deals with SIB1, SIB2 and SIB4 as examples of the first system information, the second system information, the third system information, but it is needless to say that names other than SIB1, SIB2, and SIB4 may be used, provided that they are similar system information. SIB1 includes information (e.g., "cellSelectionInfo") related to cell selection, and the information may include information related to at least one of $Q_{rxlevmin}$, $Q_{rxlevminoffset}$, $\text{Qoffset}_{temp}$, $Q_{qualmin}$, and $Q_{qualminoffset}$. SIB2 includes information (e.g., "intraFreqCellReselectionInfo") related to intra-frequency cell reselection, and the information may include information related to at least one of $Q_{rxlevmin}$, $Q_{rxlevminoffset}$, $\text{Qoffset}_{temp}$, $Q_{qualmin}$, and $Q_{qualminoffset}$. SIB4 may include information (e.g., "InterFreqCarrierFreqInfo") related to inter-frequency cell reselection, and the information may include information related to at least one of $Q_{rxlevmin}$, $Q_{rxlevminoffset}$, $\text{Qoffset}_{temp}$, $Q_{qualmin}$, and $Q_{qualminoffset}$.

(RedCap)

In 3GPP (e.g., NR release 17), it is considered to support a RedCap terminal assuming performance and a price range lower than those of an existing NR terminal introduced in release 15 or 16. The RedCap terminal is assumed to be utilized, for example, in an industrial wireless sensor, a surveillance camera (video surveillance), a wearable device, or the like.

As the capability of the RedCap terminal to be reduced relative to the existing NR terminal, for example, at least one of the number of antennas (e.g., from two or four receiving antennas to one or two receiving antennas), a bandwidth to be supported (e.g., 20 MHz at the time of initial access in the FR 1), a change from full duplex to half duplex, a maximum modulation system (e.g., from 256 QAM to 64 QAM), the maximum number of Multiple Input and Multiple Output (MIMO), and the like is considered. The RedCap terminal may be identified by a specific type. For example, the existing NR terminal and the RedCap terminal may be defined as different types (e.g., type 0, type 1, and the like). Note that the type may be rephrased as a UE type, a category, a UE category, and the like.

Further, RedCap terminals identified by a specific type may have different capabilities. For example, a plurality of RedCap terminals having different numbers of receiving antennas (e.g., RedCap terminals with a single receiving antenna, two receiving antennas, three or more receiving antennas, and the like) may be provided. Thus, a plurality of RedCap terminals having different capabilities may be identified by the above type or a subtype of the above type. Hereinafter, a terminal 10 with a single receiving antenna or a RedCap terminal with a single receiving antenna is referred to as a "single Rx terminal." Further, a terminal 10 with two receiving antennas or a RedCap terminal with two receiving antennas is referred to as a "two Rx terminal." Note that, having a single receiving antenna and having two receiving antennas may be rephrased as having a single receiver and having a dual receiver, respectively.

The coverage of the terminal 10 of a specific type (e.g., the RedCap terminal) and/or with a specific number of antennas (e.g., the single Rx terminal or the two Rx terminal) is assumed to be reduced in comparison with the existing NR terminal or the terminal 10 with more antennas than the specific number of antennas. FIG. 2 is a diagram illustrating an example of a reduction in the coverage of the terminal 10 of the specific type and/or with the specific number of antennas. For example, in FIG. 2, a terminal 10A is a single Rx terminal, and a terminal 10B is an existing NR terminal including four receiving antennas.

For example, in FIG. 2, $Q_{rxlevmeas}$ and $Q_{qualmeas}$ measured in the terminal 10A with a single receiving antenna are lower than those of the terminal 10B with a plurality of receiving antennas because the terminal 10A cannot obtain an effect of reception diversity. In the meantime, in a case where the terminal 10A and the terminal 10B perform evaluation on the cell selection criterion S based on a parameter with the same value (e.g., at least one of $Q_{rxlevmin}$, $Q_{rxlevminoffset}$, $Qoffset_{temp}$, $Q_{qualmin}$, and $Q_{qualminoffset}$), the range where the terminal 10A satisfies the cell selection criterion S (e.g., Srxlev>0 and Squal>0) might be reduced in comparison with the range where the terminal 10B satisfies the cell selection criterion S because $Q_{rxlevmeas}$ and $Q_{qualmeas}$ of the terminal 10A are smaller than those of the terminal 10B. That is, the coverage of the terminal 10A might be reduced in comparison with the coverage of the terminal 10B.

In order to compensate the coverage of the terminal 10 (e.g., the RedCap terminal and/or the single Rx terminal) of the specific type and/or the specific number of antennas, it is also assumed to transmit channels repeatedly. However, the coverage expansion by the repetition might decrease the use efficiency of radio resources (for example, a frequency domain resource and/or a time domain resource).

In view of this, in the present embodiment, (1) by prohibiting access of the terminal 10 of the specific type and/or with the specific number of antennas to a specific cell, a decrease in the use efficiency of radio resources in the specific cell is prevented. Further, (2) while the access of the terminal 10 of the specific type and/or with the specific number of antennas to the specific cell is allowed, the coverage of the terminal 10 is prevented from being reduced.

In the following description, for example, the terminal 10 of the specific type is taken as a RedCap terminal, and the terminal 10 with the specific number of antennas is taken as a single Rx terminal or a two Rx terminal, but it is needless to say that the terminal 10 of the specific type and/or with the specific number of antennas is not limited to the above. For example, the terminal with the specific number of antennas should be a terminal with fewer antennas than the terminal 10 with a given number of antennas, and for example, when the given number of antennas is eight, the specific number of antennas may be four.

(1) Case of Access Prohibition

The following describes a case where at least one of the RedCap terminal, the single Rx terminal, and the two Rx terminal is barred (restricted or not allowed) to access a specific cell. In this case, the terminal 10 determines whether the access to the specific cell is barred or not, based on at least one of information (hereinafter referred to as "RedCap access information") related to the access of the RedCap terminal to the specific cell, information (hereinafter referred to as "single Rx access information") related to the access of the single Rx terminal to the specific cell, and information (hereinafter referred to as "two Rx access information") related to the access of the two Rx terminal to the specific cell.

Here, the RedCap access information is information related to whether the access of the RedCap terminal to the specific cell is allowed or barred, for example. In the following description, the RedCap access information is information related to the permission of the access (e.g., the information is set to "true" or "1" when the access is allowed), and when the access is allowed, the RedCap access information is included in system information (e.g., SIB1), but when the access is barred, the RedCap access information is not included in the system information. However, the RedCap access information is not limited to this. For example, the RedCap access information may be information indicating that the access is barred (e.g., the information is set to "true" or "1" when the access is barred), and when the access is allowed, the RedCap access information may not be included in the system information, but when the access is barred, the RedCap access information may be included in the system information.

Further, the single Rx access information and the two Rx access information are respectively information related to whether the single Rx terminal and the two Rx terminal are allowed or barred to access to the specific cell, for example. For example, the single Rx access information and the two Rx access information are information related to the permission of the access (e.g., the information is set to "true" or "1" when the access is allowed), and when the access is allowed, the information is included in system information (e.g., SIB1), but when the access is barred, the information is not included in the system information. However, the single Rx access information and the two Rx access information are not limited to this. For example, the single Rx access information and the two Rx access information may be information indicative of the prohibition of the access (e.g., the information is set to "true" or "1" when the access is barred), and when the access is allowed, the information may not be included in the system information, but when the access is barred, the information may be included in the system information.

For example, the terminal 10 receives system information. The terminal 10 may determine whether or not the access to the specific cell is barred, based on whether or not the RedCap access information is included in the system information and/or whether or not the single Rx access information and/or the two Rx access information is included in the system information.

Further, the terminal 10 may determine whether or not the access to the specific cell is barred, based on whether or not the terminal 10 is a RedCap terminal and/or whether or not the terminal 10 is a single Rx terminal or a two Rx terminal.

FIG. 3 is a diagram illustrating an example of a determination operation on access prohibition according to the present embodiment. In step S101, the terminal 10 receives system information (e.g., SIB1).

In step S102, the terminal 10 determines whether or not the terminal 10 is in the idle state, the inactive state, or the connected state during running of a specific timer (e.g., a timer T311). Note that the specific timer defines a time until the RRC connection is re-established, and the specific timer may start when the re-establishment procedure starts and may stop when a specific cell is selected. When the specific timer expires, the terminal 10 may transition to the idle state. In a case where the terminal 10 is in the connected state with the specific timer being not running (step S102; NO), this operation is ended.

In step S103, the terminal 10 determines whether or not the terminal 10 is a RedCap terminal. In a case where the terminal 10 is not a RedCap terminal (step S103; NO), this operation proceeds to step S110.

Meanwhile, in a case where the terminal 10 is a RedCap terminal (step S103; YES), the terminal 10 determines, in step S104, whether or not access of the RedCap terminal to the specific cell is allowed. For example, the terminal 10 may determine whether or not RedCap access information is included in the system information received in step S101.

In a case where the access of the RedCap terminal to the specific cell is not allowed (step S104; NO), this operation proceeds to step S109. In the meantime, in a case where the access of the RedCap terminal to the specific cell is allowed (step S104; YES), the terminal 10 determines, in step S105, whether or not access of the single Rx terminal to the specific cell is allowed. For example, the terminal 10 may determine whether or not single Rx access information is included in the system information received in step S101. In a case where the access of the single Rx terminal to the specific cell is allowed (step S105; YES), this operation proceeds to step S107.

In a case where the access of the single Rx terminal to the specific cell is not allowed (step S105; NO), the terminal 10 determines, in step S106, whether or not the terminal 10 is a single Rx terminal. In a case where the terminal 10 is a single Rx terminal (step S106; YES), this operation proceeds to step S109. In a case where the terminal 10 is not a single Rx terminal (step S106; NO), this operation proceeds to step S107.

In step S107, the terminal 10 determines whether or not access of a two Rx terminal to the specific cell is allowed. For example, the terminal 10 may determine whether or not two Rx access information is included in the system information received in step S101. In a case where the access of the two Rx terminal to the specific cell is allowed (step S107; YES), this operation proceeds to step S110.

In a case where the access of the two Rx terminal to the specific cell is not allowed (step S107; NO), the terminal 10 determines, in step S108, whether or not the terminal 10 is a two Rx terminal. In a case where the terminal 10 is a two Rx terminal (step S108; YES), this operation proceeds to step S109. In a case where the terminal 10 is not a two Rx terminal (step S108; NO), this operation proceeds to step S110.

In step S109, the terminal 10 determines that the access to the specific cell is barred. As described above, the terminal 10 can determines that the access to the specific cell is barred, by use of the following determination conditions, for example.

1> if in RRC_IDLE or RRC_INACTIVE or in RRC_CONNECTED while T311 is running;
  2> if the UE is a reduced capability UE according to TS 38.306 [26]:
    3> if redCap-AccessAllowed is not included in SIB1; or
    3> if redCap-AccessAllowed is set to true in SIB1, and singleRx-AccessAllowed is not included in SIB1, and the reduced capability UE supports no more than a single receiver; or
    3> if redCap-AccessAllowed is set to true in SIB1, and twoRx-AccessAllowed is not included in SIB1, and the reduced capability UE supports no more than a dual receiver:
      4> consider the cell as barred in accordance with TS 38.304 [20];

In step S110, the terminal 10 determines, based on the cell selection criterion S, whether or not the terminal 10 camps on the specific cell. More specifically, in a case where the specific cell satisfies the cell selection criterion S, the terminal 10 may camp on the specific cell.

Note that the determination operation illustrated in FIG. 3 is just an example, and some steps may be omitted, or an unillustrated step may be added. Further, the order of at least some of the steps may be changed. For example, the determination order of step 105 and S106 and the determination order of step S107 and S108 may be changed.

FIG. 4 is a diagram illustrating an example of specification changes in the RedCap access information and the single Rx access information according to the present embodiment. For example, in FIG. 4, information (e.g., "cellAccessRelatedInfo") related to cell access in SIB1 includes RedCap access information (e.g., "redCap-AccessAllowed"), single Rx access information (e.g., "singleRx-AccessAllowed"), and two Rx access information (e.g., "twoRx-AccessAllowed").

For example, in FIG. 4, in a case where the access of the RedCap terminal to the specific cell is allowed, the RedCap access information is set to true and is included in SIB1. Further, in a case where the access of the single Rx terminal to the specific cell is allowed, the single Rx access information is set to true and is included in SIB1. Further, in a case where the access of the two Rx terminal to the specific cell is allowed, the two Rx access information is set to true and is included in SIB1.

Further, the single Rx access information may be Conditional Presence. More specifically, in a case where the RedCap access information indicates the access of the RedCap terminal is allowed (e.g., in FIG. 4, in a case where the RedCap access information is set to true), the single Rx access information may be included in SIB1, and in other cases, the single Rx access information may not be included in SIB1. Further, the two Rx access information may be also Conditional Presence. More specifically, in a case of a cell on a frequency band that requires the terminal 10 to support four receiving antennas, the two Rx access information may be included in SIB1, and in other cases, the two Rx access information may not be included in SIB1.

Note that the example of specification changes in FIG. 4 is just an example and is not limited to those illustrated herein. For example, at least one of the RedCap access information, the single Rx access information, and the two Rx access information may be set to true in a case where the access is not allowed (that is, the access is restricted).

Further, the single Rx access information and/or the two Rx access information may not be Conditional Presence. Further, SIB1 should include at least one of the RedCap access information, the single Rx access information, and the two Rx access information.

As described above, in a case where the access of at least one of the RedCap terminal, the single Rx terminal, and the two Rx terminal to the specific cell is restricted, it is possible to avoid the occurrence of a reduction in the coverage of the at least one of the RedCap terminal, the single Rx terminal, and the two Rx terminal in the specific cell. This makes it possible to prevent a decrease in the use efficiency of radio resources due to repetition transmission to compensate the coverage.

Note that, in the above description, whether or not the access to the specific cell is barred is determined based on whether or not the RedCap access information is included in the system information and/or whether or not the single Rx access information and/or the two Rx access information is included in the system information, but the present invention is not limited to this. For example, in a case where the RedCap access information, the single Rx access information, or the two Rx access information is included in the system information in either of the case where the RedCap access information, the single Rx access information, or the two Rx access information indicates the access is allowed and the case where the RedCap access information, the single Rx access information, or the two Rx access information indicates the access is barred, the terminal 10 may determine whether or not the access to the specific cell is barred, based on a value of the RedCap access information, the single Rx access information, or the two Rx access information in the system information.

(2) Case of Access Permission

Next will be described a case of at least one of the RedCap terminal, the single Rx terminal, and the two Rx terminal is allowed to access a specific cell. In this case, the coverage of at least one of the RedCap terminal, the single Rx terminal, and the two Rx terminal may be expanded by use of a cell selection criterion S1 or S2 obtained by relaxing the cell selection criterion S for the single Rx terminal or the two Rx terminal.

Note that the following mainly deals with a case where the cell selection criteria S1 and S2 are used for the single Rx terminal, but in a case where the cell selection criteria S1 and S2 are used for the two Rx terminal, the following "single Rx terminal" should be replaced with the "two Rx terminal."

(2.1) Cell Selection Criterion S1

In the cell selection criterion S1, the terminal 10 derives Srxlev based on $Q_{rxlevmin}$ for the single Rx terminal and/or derives Squal based on $Q_{qualmin}$ for the single Rx terminal.

More specifically, the terminal 10 receives information (hereinafter referred to as "$Q_{rxlevmin,SingleRx}$ information") related to $Q_{rxlevmin}$ for the single Rx terminal in a specific cell and/or information (hereinafter referred to as "$Q_{qualmin,SingleRx}$ information") related to $Q_{qualmin}$ for the single Rx terminal in the specific cell. The $Q_{rxlevmin,SingleRx}$ information may be rephrased as minimum reception level information related to the minimum reception level for the single Rx terminal, and the $Q_{qualmin,SingleRx}$ information may be rephrased as minimum quality level information related to the minimum quality level for the single Rx terminal. Further, the $Q_{rxlevmin,SingleRx}$ information and/or the $Q_{qualmin,SingleRx}$ information may be included in system information. For example, the $Q_{rxlevmin,SingleRx}$ information and/or the $Q_{qualmin,SingleRx}$ information may be included in at least one of the aforementioned SIB1, SIB2, and SIB4.

The terminal 10 derives $Q_{rxlevmin}$ for the single Rx terminal based on the $Q_{rxlevmin,SingleRx}$ information and derives $Q_{qualmin}$ for the single Rx terminal based on the $Q_{qualmin,SingleRx}$ information. The terminal 10 may control cell selection/reselection based on Srxlev derived based on $Q_{rxlevmin}$ for the single Rx terminal and $Q_{rxlevmeas}$ measured in the specific cell and/or Squal derived based on $Q_{qualmin}$ for the single Rx terminal and $Q_{qualmeas}$ measured in the specific cell.

Note that $Q_{rxlevmin}$ and $Q_{qualmin}$ for the single Rx terminal may have values smaller than $Q_{rxlevmin}$ and $Q_{qualmin}$ for a terminal with more antennas than a specific number of antennas (e.g., a single or two receiving antennas). Hereby, even when $Q_{rxlevmeas}$ and $Q_{qualmeas}$ measured by the single Rx terminal are smaller than $Q_{rxlevmeas}$ and $Q_{qualmeas}$ measured by the terminal with more antennas, the cell selection criterion S1 is easily satisfied, so that the coverage of the single Rx terminal can be expanded.

FIG. 5 is a diagram illustrating an example of the cell selection criterion S1 according to the present embodiment. For example, the terminal 10 in FIG. 5 is a single Rx terminal. As illustrated in FIG. 5, Srxlev in the cell selection criterion S1 may be derived based on at least one of $Q_{rxlevmeas}$, $Q_{rxlevminoffset}$, $P_{compensation}$, and $Qoffset_{temp}$ in addition to $Q_{rxlevmin}$ for the single Rx terminal. Further, Squal may be derived based on at least one of $Q_{qualmeas}$, $Q_{qualminoffset}$, and $Qoffset_{temp}$ in addition to $Q_{qualmin}$ for the single Rx terminal. In FIG. 5, expressions for the cell selection criterion S1 are described, but they are just an example and are not limited to those illustrated herein. For example, if Srxlev and/or Squal in the cell selection criterion S1 are larger (or equal to or larger) than a given value, the given value is not limited to 0.

$Q_{rxlevmin}$ in the cell selection criterion S1 is derived based on $Q_{rxlevmin,SingleRx}$ information that is a parameter different from a parameter (e.g., "q-RxLevMin" or "q-RxLevMin-SUL") used in the cell selection criterion S. For example, as illustrated in FIG. 5, in a case where the terminal 10 is a single Rx terminal, the $Q_{rxlevmin,SingleRx}$ information is included in SIB1, SIB2, and SIB4, and RedCap access information and single Rx access information in SIB1 both indicate the access to the specific cell is allowed (e.g., they are set to true), $Q_{rxlevmin}$ may be derived based on the $Q_{rxlevmin,SingleRx}$ information (e.g., "q-RxLevMinSingleRx").

Further, $Q_{qualmin}$ in the cell selection criterion S1 is derived based on $Q_{qualmin,SingleRx}$ information that is a parameter different from a parameter (e.g., "q-QualMin") used in the cell selection criterion S. For example, as illustrated in FIG. 5, in a case where the terminal 10 is a single Rx terminal, the $Q_{qualmin,SingleRx}$ information is included in SIB1, SIB2 and SIB4, and RedCap access information and single Rx access information in SIB1 both indicate the access to the specific cell is allowed (e.g., they are set to true), $Q_{qualmin}$ may be derived based on the $Q_{qualmin,SingleRx}$ information (e.g., "q-QualMinSingleRx").

Note that, in a case where the cell selection criterion S1 is used for the two Rx terminal, the $Q_{rxlevmin,SingleRx}$ information should be replaced with "information (hereinafter referred to as "$Q_{rxlevmin,TwoRx}$ information") related to $Q_{rxlevmin}$ for the two Rx terminal in the specific cell." Further, the $Q_{qualmin,SingleRx}$ information should be replaced with "information (hereinafter referred to as "$Q_{qualmin,TwoRx}$ information") related to $Q_{qualmin}$ for the two Rx terminal in the specific cell." Here, "q-RxLevMinSingleRx" as an example of the $Q_{rxlevmin,SingleRx}$ information should be replaced with "RxLevMinTwoRx" as an example of the $Q_{rxlevmin,TwoRx}$ information. Further, "q-QualMinSingleRx" as an example of the $Q_{qualmin,SingleRx}$ information should be replaced with "q-QualMinTwoRx" as an example of the $Q_{qualmin,TwoRx}$ information. Further, the "single Rx access information" should be replaced with "two Rx access information."

FIGS. 6 to 8 are diagrams each illustrating an example of specification changes in the cell selection criterion S1 according to the present embodiment. For example, in FIG. 6, in information (e.g., "cellSelectionInfo") related to cell selection in SIB1, $Q_{rxlevmin,SingleRx}$ information (e.g., "q-RxLevMinSingleRx"), $Q_{qualmin,SingleRx}$ information (e.g., "q-QualMinSingleRx"), $Q_{rxlevmin,TwoRx}$ information (e.g., "RxLevMinTwoRx"), and $Q_{qualmin,TwoRx}$ information (e.g., "q-QualMinTwoRx") are defined. The $Q_{rxlevmin,SingleRx}$ information and the $Q_{qualmin,SingleRx}$ information, or the $Q_{rxlevmin,TwoRx}$ information and the $Q_{qualmin,TwoRx}$ information may be used to derive $Q_{rxlevmin}$ and $Q_{qualmin}$ in the cell selection criterion S1 at the time of cell selection. Note that, in a case where the terminal 10 is a single Rx terminal, if the $Q_{rxlevmin,SingleRx}$ information and the $Q_{qualmin,SingleRx}$ information are not included in SIB1, $Q_{rxlevmin}$ and $Q_{qualmin}$ may be derived based on existing parameters (e.g., "q-RxLevMin" and "q-QualMin") in SIB1, and cell selection may be controlled based on the existing cell selection criterion S based on $Q_{rxlevmin}$ and $Q_{qualmin}$ thus derived. Further, in a case where the terminal 10 is a two Rx terminal, if the $Q_{rxlevmin,TwoRx}$ information and the $Q_{qualmin,TwoRx}$ information are not included in SIB1, $Q_{rxlevmin}$ and $Q_{qualmin}$ may be derived based on existing parameters (e.g., "q-RxLevMin" and "q-QualMin") in SIB1, and cell selection may be controlled based on the existing cell selection criterion S based on $Q_{rxlevmin}$ and $Q_{qualmin}$ thus derived.

Further, at least one of $Q_{rxlevmin,SingleRx}$ information and $Q_{qualmin,SingleRx}$ information, $Q_{rxlevmin,TwoRx}$ information and $Q_{qualmin,TwoRx}$ information, and information (e.g., "cellSelectionInfo") related to cell selection and including them may be Conditional Presence. More specifically, in a case where single Rx access information indicates the access of the single Rx terminal is allowed (e.g., in a case where the single Rx access information is set to true in FIG. 6), the $Q_{rxlevmin,SingleRx}$ information and the $Q_{qualmin,SingleRx}$ information may be included in SIB1, and in other cases, they may not be included in SIB1. Further, in a case where two Rx access information indicates the access of the two Rx terminal is allowed (e.g., in a case where the two Rx access information is set to true in FIG. 6), the $Q_{rxlevmin,TwoRx}$ information and the $Q_{qualmin,TwoRx}$ information may be included in SIB1, and in other cases, they may not be included in SIB1. Further, in a case where RedCap access information indicates the access of the RedCap terminal is allowed (e.g., in a case where the RedCap access information is set to true in FIG. 6), the information related to cell selection may be included in SIB1, and in other cases, the information may not be included in SIB1.

In FIG. 7, in information (e.g., "intraFreqCellReselectionInfo") related to intra-frequency cell reselection in SIB2, $Q_{rxlevmin,SingleRx}$ information (e.g., "q-RxLevMinSingleRx"), $Q_{qualmin,SingleRx}$ information (e.g., "q-QualMinSingleRx"), $Q_{rxlevmin,TwoRx}$ information (e.g., "RxLevMinTwoRx"), and $Q_{qualmin,TwoRx}$ information (e.g., "q-QualMinTwoRx") are defined. The $Q_{rxlevmin,SingleRx}$ information and the $Q_{qualmin,SingleRx}$ information, or the $Q_{rxlevmin,TwoRx}$ information and the $Q_{qualmin,TwoRx}$ information may be used to derive $Q_{rxlevmin}$ and $Q_{qualmin}$ in the cell selection criterion S1 at the time of intra-frequency cell reselection. Note that, in a case where the terminal 10 is a single Rx terminal, if the $Q_{rxlevmin,SingleRx}$ information and the $Q_{qualmin,SingleRx}$ information are not included in SIB2, $Q_{rxlevmin}$ and $Q_{qualmin}$ may be derived based on existing parameters (e.g., "q-RxLevMin" and "q-QualMin" in "intraFreqCellReselectionInfo") in SIB2, and cell reselection may be controlled based on the existing cell selection criterion S based on $Q_{rxlevmin}$ and $Q_{qualmin}$ thus derived. Further, in a case where the terminal 10 is a two Rx terminal, if the $Q_{rxlevmin,TwoRx}$ information and the $Q_{qualmin,TwoRx}$ information are not included in SIB2, $Q_{rxlevmin}$ and $Q_{qualmin}$ may be derived based on existing parameters (e.g., "q-RxLevMin" and "q-QualMin" in "intraFreqCellReselectionInfo") in SIB2, and cell reselection may be controlled based on the existing cell selection criterion S based on $Q_{rxlevmin}$ and $Q_{qualmin}$ thus derived.

In FIG. 8, as information (e.g., "InterFreqNeighCellInfo") related to each inter-frequency in the list (e.g., "interFreqCarrierFreqList") of information related to inter-frequencies in SIB4, $Q_{rxlevmin,SingleRx}$ information (e.g., "q-RxLevMinSingleRx"), $Q_{qualmin,SingleRx}$ information (e.g., "q-QualMinSingleRx"), $Q_{rxlevmin,TwoRx}$ information (e.g., "RxLevMinTwoRx"), and $Q_{qualmin,TwoRx}$ information (e.g., "q-QualMinTwoRx") are defined. The $Q_{rxlevmin,SingleRx}$ information and the $Q_{qualmin,SingleRx}$ information, or the $Q_{rxlevmin,TwoRx}$ information and the $Q_{qualmin,TwoRx}$ information may be used to derive $Q_{rxlevmin}$ and $Q_{qualmin}$ in the cell selection criterion S1 at the time of inter-frequency cell reselection. Note that, in a case where the terminal 10 is a single Rx terminal, if the $Q_{rxlevmin,SingleRx}$ information and the $Q_{qualmin,SingleRx}$ information are not included in SIB4, $Q_{rxlevmin}$ and $Q_{qualmin}$ may be derived based on existing parameters (e.g., "q-RxLevMin" and "q-QualMin" in "InterFreqCarrierFreqInfo") in SIB4, and cell reselection may be controlled based on the existing cell selection criterion S based on $Q_{rxlevmin}$ and $Q_{qualmin}$ thus derived. Further, in a case where the terminal 10 is a two Rx terminal, if the $Q_{rxlevmin,TwoRx}$ information and the $Q_{qualmin,TwoRx}$ information are not included in SIB4, $Q_{rxlevmin}$ and $Q_{qualmin}$ may be derived based on existing parameters (e.g., "q-RxLevMin" and "q-QualMin" in "InterFreqCarrierFreqInfo") in SIB4, and cell reselection may be controlled based on the existing cell selection criterion S based on $Q_{rxlevmin}$ and $Q_{qualmin}$ thus derived.

As described above, with the cell selection criterion S1, Srxlev is derived based on $Q_{rxlevmin}$ for the single Rx terminal or the two Rx terminal, and/or Squal is derived based on $Q_{qualmin}$ for the single Rx terminal or the two Rx terminal, and hereby, it is possible to expand a range where the single Rx terminal or the two Rx terminal assumed to have measured values of $Q_{rxlevmeas}$ and $Q_{qualmin}$ that are smaller than those of the terminal with more antennas satisfies the cell selection criterion S1. Accordingly, it is possible to expand the coverage for the single Rx terminal or the two Rx terminal.

(2.2) Cell Selection Criterion S2

In the cell selection criterion S2, the terminal 10 derives Srxlev based on an offset (hereinafter referred to as "$Q_{rxlevminoffset,Rx}$") for the single Rx terminal or the two Rx terminal to $Q_{rxlevmin}$ in a specific cell and/or derives Squal based on an offset (hereinafter referred to as "$Q_{qualminoffset,Rx}$") for the single Rx terminal or the two Rx terminal to $Q_{qualmin}$ in the specific cell.

More specifically, the terminal 10 receives information (hereinafter referred to as "$Q_{rxlevmin}$ information") related to $Q_{rxlevmin}$ in a specific cell and/or information (hereinafter referred to as "$Q_{qualmin}$ information") related to $Q_{qualmin}$ in the specific cell. The $Q_{rxlevmin}$ information may be rephrased as minimum reception level information related to the minimum reception level, and the $Q_{qualmin}$ information may be rephrased as minimum quality level information related to the minimum quality level.

Further, the $Q_{rxlevmin}$ information and/or the $Q_{qualmin}$ information may be included in system information. For example, the $Q_{rxlevmin}$ information and/or the $Q_{qualmin}$ information may be included in at least one of the aforementioned SIB1, SIB2, and SIB4. The terminal 10 derives $Q_{rxlevmin}$ based on the $Q_{rxlevmin}$ information. Further, the terminal 10 derives $Q_{qualmin}$ based on the $Q_{qualmin}$ information. Note that $Q_{rxlevmin}$ and $Q_{qualmin}$ may be common to the single Rx terminal or the two Rx terminal and the terminal with more antennas.

The terminal 10 may control cell selection/reselection based on Srxlev derived based on $Q_{rxlevmin}$, $Q_{rxlevminoffset,Rx}$ for the single Rx terminal or the two Rx terminal to $Q_{rxlevmin}$, and $Q_{rxlevmeas}$ measured in a specific cell, and/or Squal derived based on $Q_{qualmin}$, $Q_{qualminoffset,Rx}$ for the single Rx terminal or the two Rx terminal to $Q_{qualmin}$, and $Q_{qualmeas}$ measured in the specific cell.

FIG. 9 is a diagram illustrating an example of the cell selection criterion S2 according to the present embodiment. For example, the terminal 10 in FIG. 9 is a single Rx terminal. As illustrated in FIG. 9, Srxlev in the cell selection criterion S2 may be derived based on at least one of $Q_{rxlevmin}$, $Q_{rxlevmeas}$, $Q_{rxlevminoffset}$, $Q_{rxlevminoffset,Rx}$, $P_{compensation}$, and $Qoffset_{temp}$. Further, Squal may be derived based on at least one of $Q_{qualmin}$, $Q_{qualmeas}$, $Q_{qualminoffset}$, $Q_{qualminoffset,Rx}$, and $Qoffset_{temp}$. In FIG. 9, expressions for the cell selection criterion S2 are described, but they are just an example and are not limited to those illustrated herein. For example, if Srxlev and/or Squal in the cell selection criterion S2 are larger (or equal to or larger) than a given value, the given value is not limited to 0.

$Q_{rxlevminoffset,Rx}$ and/or $Q_{qualminoffset,Rx}$ in the cell selection criterion S2 may be values determined in advance (e.g., value(s) determined in the specification). Alternatively, the terminal 10 may receive information (hereinafter referred to as "$Q_{rxlevminoffset,Rx}$ information") related to $Q_{rxlevminoffset,Rx}$ and derive $Q_{rxlevminoffset,Rx}$ based on the received $Q_{rxlevminoffset,Rx}$ information. Further, the terminal 10 may receive information (hereinafter referred to as "$Q_{qualminoffset,Rx}$ information") related to $Q_{qualminoffset,Rx}$ and derive $Q_{qualminoffset,Rx}$ based on the received $Q_{qualminoffset,Rx}$ information.

The $Q_{rxlevminoffset,Rx}$ information may be rephrased as information related to an offset to $Q_{rxlevmin}$. Further, the $Q_{qualminoffset,Rx}$ information may be rephrased as information related to an offset to $Q_{qualmin}$. The $Q_{rxlevminoffset,Rx}$ information and/or the $Q_{qualminoffset,Rx}$ information may be included in system information. For example, the $Q_{rxlevminoffset,Rx}$ information and/or the $Q_{qualminoffset,Rx}$ information may be included in at least one of SIB1, SIB2, and SIB4.

Further, the $Q_{rxlevminoffset,Rx}$ information may include information (hereinafter referred to as "$Q_{rxlevminoffset,SingleRx}$ information", e.g., "q-RxLevMinOffsetSingleRx") related to an offset for the single Rx terminal to $Q_{rxlevmin}$, and/or information (hereinafter referred to as "$Q_{rxlevminoffset,TwoRx}$ information", e.g., "q-RxLevMinOffsetTwoRx") related to an offset for the two Rx terminal to $Q_{rxlevmin}$. Further, the $Q_{rxlevminoffset,Rx}$ information may include information (hereinafter referred to as "$Q_{qualminoffset,SingleRx}$ information", e.g., "q-RxLevMinOffsetSingleRx") related to an offset for the single Rx terminal to $Q_{qualmin}$, and/or information (hereinafter referred to as "$Q_{qualminoffset,TwoRx}$ information", e.g., "q-RxLevMinOffsetTwoRx") related to an offset for the two Rx terminal to $Q_{qualmin}$.

In the cell selection criterion S2, $Q_{rxlevminoffset,Rx}$ and/or $Q_{qualminoffset,Rx}$ for the single Rx terminal or the two Rx terminal are used, so that it is possible to expand a range where the single Rx terminal or the two Rx terminal assumed to have measured values of $Q_{rxlevmeas}$ and $Q_{qualmeas}$ that are smaller than those of the terminal with more antennas satisfies the cell selection criterion S2. Accordingly, it is possible to expand the coverage for the single Rx terminal or the two Rx terminal.

FIGS. 10 to 12 are diagrams each illustrating an example of specification changes in the cell selection criterion S2 according to the present embodiment. For example, in FIG. 10, in information (e.g., "cellSelectionInfo") related to cell selection in SIB1, $Q_{rxlevminoffset,SingleRx}$ information (e.g., "q-RxLevMinOffsetSingleRx"), $Q_{qualminoffset,SingleRx}$ information (e.g., "q-QualMinOffsetSingleRx"), $Q_{rxlevminoffset,TwoRx}$ information (e.g., "q-RxLevMinOffsetTwoRx"), and $Q_{qualminoffset,TwoRx}$ information (e.g., "q-QualMinOffsetTwoRx") are defined. The $Q_{rxlevminoffset,SingleRx}$ information and the $Q_{qualminoffset,SingleRx}$ information, or the $Q_{rxlevminoffset,TwoRx}$ information and the $Q_{qualminoffset,TwoRx}$ information may be used to derive Srxlev and Squal as offsets to $Q_{rxlevmin}$ and $Q_{qualmin}$ in the cell selection criterion S2 at the time of cell selection. Note that, in a case where the terminal 10 is a single Rx terminal, if the $Q_{rxlevminoffset,SingleRx}$ information and the $Q_{qualminoffset,SingleRx}$ information are not included in SIB1, the terminal 10 may apply a default value (e.g., 0 (zero)) to $Q_{rxlevminoffset,Rx}$ and $Q_{qualminoffset,Rx}$ in the cell selection criterion S2. Further, in a case where the terminal 10 is a two Rx terminal, if the $Q_{rxlevminoffset,TwoRx}$ information and the $Q_{qualminoffset,TwoRx}$ information are not included in SIB1, the terminal 10 may apply a default value (e.g., 0 (zero)) to $Q_{rxlevminoffset,Rx}$ and $Q_{qualminoffset,Rx}$.

Further, at least one of the $Q_{rxlevminoffset,SingleRx}$ information, the $Q_{qualminoffset,SingleRx}$ information, the $Q_{rxlevminoffset,TwoRx}$ information, the $Q_{qualminoffset,TwoRx}$ information, and information (e.g., "cellSelectionInfo") related to cell selection and including them may be Conditional Presence. More specifically, in a case where single Rx access information indicates the access of the single Rx terminal is allowed (e.g., in a case where the single Rx access information is set to true in FIG. 10), the $Q_{rxlevminoffset,SingleRx}$ information and the $Q_{qualminoffset,SingleRx}$ information may be included in SIB1, and in other cases, they may not be included in SIB1. Further, in a case where two Rx access information indicates the access of the two Rx terminal is allowed (e.g., in a case where the two Rx access information is set to true in FIG. 10), the $Q_{rxlevminoffset,TwoRx}$ information and the $Q_{qualminoffset,TwoRx}$ information may be included in SIB1, and in other cases, they may not be included in SIB1. Further, in a case where RedCap access information indicates the access of the RedCap terminal is allowed (e.g., in a case where the RedCap access information is set to true in FIG. 10), the information related to cell selection may be included in SIB1, and in other cases, the information may not be included in SIB1.

In FIG. 11, in information (e.g., "intraFreqCellReselectionInfo") related to intra-frequency cell reselection in SIB2, $Q_{rxlevminoffset,SingleRx}$ information (e.g., "q-RxLevMinOffsetSingleRx"), $Q_{qualminoffset,SingleRx}$ information (e.g., "q-QualMinOffsetSingleRx"), $Q_{rxlevminoffset,TwoRx}$ information (e.g., "q-RxLevMinOffsetTwoRx"), and $Q_{qualminoffset,TwoRx}$ information (e.g., "q-QualMinOffsetTwoRx") are defined. The $Q_{rxlevminoffset,SingleRx}$ information and the $Q_{qualminoffset,SingleRx}$ information, or the $Q_{rxlevminoffset,TwoRx}$ information and the $Q_{qualminoffset,TwoRx}$ information may be used to derive Srxlev and Squal as offsets to $Q_{rxlevmin}$ and $Q_{qualmin}$ in the cell selection criterion S2 at the time of intra-frequency cell reselection. Note that, in a case where the terminal 10 is a single Rx terminal, if the $Q_{rxlevminoffset,SingleRx}$ information and the $Q_{qualminoffset,SingleRx}$ information are not included in SIB2, the terminal 10 may apply a default value (e.g., 0 (zero)) to $Q_{rxlevminoffset,Rx}$ and $Q_{qualminoffset,Rx}$ in the cell selection criterion S2. Further, in a case where the terminal 10 is a two Rx terminal, if the $Q_{rxlevminoffset,TwoRx}$ information and the $Q_{qualminoffset,TwoRx}$ information are not included in SIB2, the terminal 10 may apply a default value (e.g., 0 (zero)) to $Q_{rxlevminoffset,Rx}$ and $Q_{qualminoffset,Rx}$.

In FIG. 12, as information (e.g., "InterFreqNeighCellInfo") related to each inter-frequency in the list (e.g., "interFreqCarrierFreqList") of information related to inter-frequencies in SIB4, $Q_{rxlevminoffset,SingleRx}$ information (e.g., "q-RxLevMinOffsetSingleRx"), $Q_{qualminoffset,SingleRx}$ information (e.g., "q-QualMinOffsetSingleRx"), $Q_{rxlevminoffset,TwoRx}$ information (e.g., "q-RxLevMinOffsetTwoRx"), and $Q_{qualminoffset,TwoRx}$ information (e.g., "q-QualMinOffsetTwoRx") are defined. The $Q_{rxlevminoffset,SingleRx}$ information and the $Q_{qualminoffset,SingleRx}$ information, or the $Q_{rxlevminoffset,TwoRx}$ information and the $Q_{qualminoffset,TwoRx}$ information may be used to derive Srxlev and Squal as offsets to $Q_{rxlevmin}$ and $Q_{qualmin}$ in the cell selection criterion S2 at the time of inter-frequency cell reselection. Note that, in a case where the terminal 10 is a single Rx terminal, if the $Q_{rxlevminoffset,SingleRx}$ information and/or the $Q_{qualminoffset,SingleRx}$ information are not included in SIB4, the terminal 10 may apply a default value (e.g., 0 (zero)) to $Q_{rxlevminoffset,Rx}$ and/or $Q_{qualminoffset,Rx}$ in the cell selection criterion S2. Further, in a case where the terminal 10 is a two Rx terminal, if the $Q_{rxlevminoffset,TwoRx}$ information and/or the $Q_{qualminoffset,TwoRx}$ information are not included in SIB4, the terminal 10 may apply a default value (e.g., 0 (zero)) to $Q_{rxlevminoffset,Rx}$ and/or $Q_{qualminoffset,Rx}$.

As described above, with the cell selection criterion S2, Srxlev is derived based on $Q_{rxlevminoffset,Rx}$ for the single Rx terminal or the two Rx terminal, and/or Squal is derived based on $Q_{qualminoffset,Rx}$ for the single Rx terminal or the two Rx terminal, and hereby, it is possible to expand a range where the single Rx terminal or the two Rx terminal assumed to have measured values of $Q_{rxlevmeas}$ and $Q_{qualmin}$ that are smaller than those of the terminal with more antennas satisfies the cell selection criterion S2. Accordingly, it is possible to expand the coverage for the single Rx terminal or the two Rx terminal.

Note that the cell selection criteria S1 and S2 may be used in combination. More specifically, Srxlev may be derived based on $Q_{rxlevmin}$ for the single Rx terminal or the two Rx terminal in the cell selection criterion S1 and $Q_{rxlevminoffset,Rx}$ for the single Rx terminal or the two Rx terminal in the cell selection criterion S2. Further, Squal may be derived based on $Q_{qualmin}$ for the single Rx terminal or the two Rx terminal in the cell selection criterion S1 and $Q_{qualminoffset,Rx}$ for the single Rx terminal or the two Rx terminal in the cell selection criterion S2.

As described above, in a case where the access of at least one of the RedCap terminal, the single Rx terminal, and the two Rx terminal to a specific cell is allowed, the coverage of the at least one of the RedCap terminal, the single Rx terminal, and the two Rx terminal can be prevented from being reduced, by use of the cell selection criteria S1 and/or S2, and cell selection/reselection can be controlled appropriately.

Note that, in terms of the cell selection criterion S1, $Q_{rxlevmin}$ and $Q_{qualmin}$ for the single Rx terminal or the two Rx terminal have been described, but naturally, the cell selection criterion S1 can be applied to $Q_{rxlevmin}$ and $Q_{qualmin}$ for the RedCap terminal. Similarly, in terms of the cell selection criterion S2, $Q_{rxlevminoffset,Rx}$ and $Q_{qualminoffset,Rx}$ for the single Rx terminal or the two Rx terminal have been described, but naturally, the cell selection criterion S2 can be applied to $Q_{rxlevminoffset}$ and $Q_{qualminoffset}$ for the RedCap terminal.

Further, the case (1) of access prohibition and the case (2) of access permission can be combined. For example, in a case where access to a specific cell is barred and access to a cell with a carrier frequency the same as and/or different from that of the specific cell is allowed, the terminal 10 may control reselection of the cell based on the cell selection criteria S1 and/or S2.

(Configuration of Wireless Communication System)

Next will be described the configuration of each equipment in the wireless communication system 1. Note that the following configurations are intended to describe a necessary configuration in the description of the present embodiment and do not exclude each equipment from including a functional block other than those illustrated herein.

Hardware Configuration

FIG. 13 is a diagram illustrating an example of the hardware configuration of each equipment in the wireless communication system according to the present embodiment. Each equipment in the wireless communication system 1 (for example, the terminal 10, the base station 20, the CN 30, or the like) includes a processor 11, a storage device 12, a communication device 13 for performing wired or wireless communication, and an input/output device 14 for accepting various input operations and outputting various information.

The processor 11 is, for example, a CPU (Central Processing Unit) to control each equipment in the wireless communication system 1. The processor 11 may read a program from the storage device 12 and execute the program to perform various processing to be described in the present embodiment. Each equipment in the wireless communication system 1 may also be configured to include one or more processors 11. Further, each equipment concerned may also be called a computer.

The storage device 12 is constituted by, for example, storages such as a memory, an HDD (Hard Disk Drive), and/or an SSD (Solid State Drive). The storage device 12 may also store various information required to perform processing by the processor 11 (for example, programs and the like executed by the processor 11).

The communication device 13 is a device for performing communication through wired and/or wireless networks and may include a network card, a communication module, a chip, an antenna, and the like, for example. Further, an amplifier, an RF (Radio Frequency) device for performing processing on radio signals, and a BB (Base Band) device for performing processing on baseband signals may be included in the communication device 13.

The RF device performs D/A conversion, modulation, frequency conversion, power amplification, and the like on a digital baseband signal received from the BB device, for example, to generate a radio signal to be transmitted from an antenna A. Further, the RF device performs frequency conversion, demodulation, A/D conversion, and the like on a radio signal received from the antenna to generate and transmit a digital baseband signal to the BB device. The BB device performs processing for converting the digital baseband signal to a packet and processing for converting the packet to a digital baseband signal.

The input/output device 14 includes input devices such as a keyboard, a touch panel, a mouse, and/or a microphone, and output devices such as a display and/or a speaker, for example.

Note that the hardware configuration described above is just an example. In each equipment inside the wireless communication system 1, part of the hardware illustrated in FIG. 13 may be omitted, or any other hardware unillustrated in FIG. 13 may be included. Further, the hardware illustrated in FIG. 13 may be constituted by one or more chips.

Functional Block Configuration

Terminal

Figure 14:
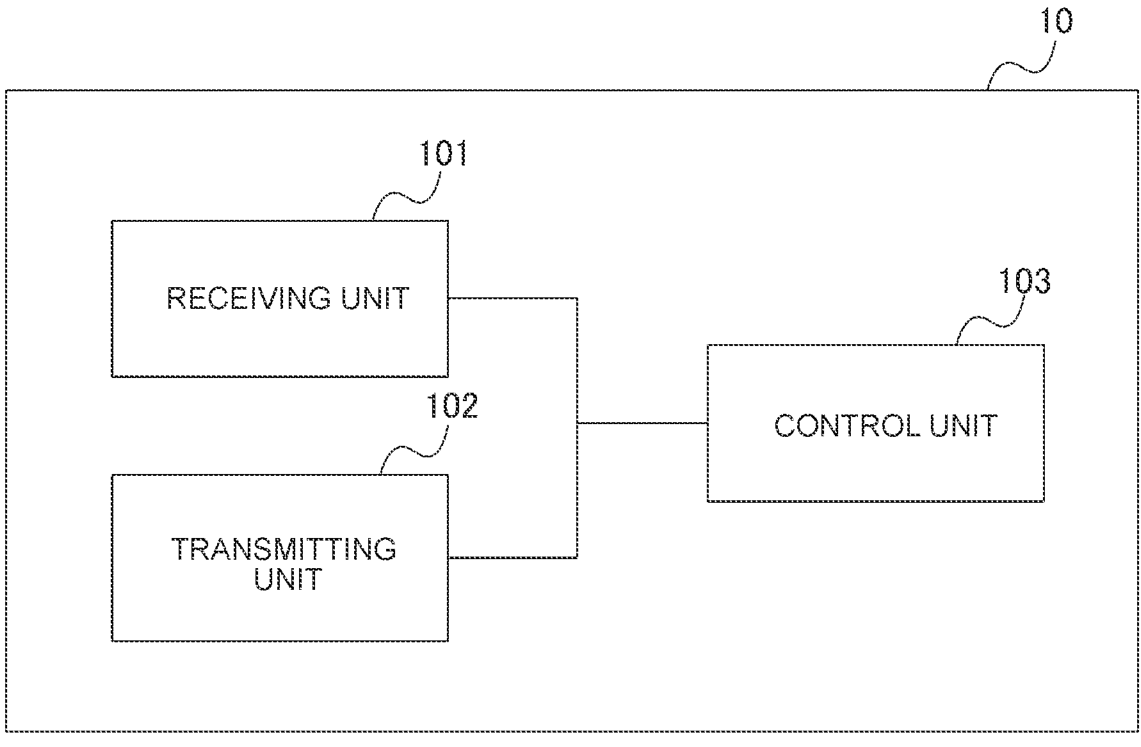
FIG. 14 is a diagram illustrating an example of the functional block configuration of the terminal according to the present embodiment.

FIG. 14 is a diagram illustrating an example of the functional block configuration of the terminal according to the present embodiment. As illustrated in FIG. 14, the terminal 10 includes a receiving unit 101, a transmitting unit 102, and a control unit 103.

All or some of the functions implemented by the receiving unit 101 and the transmitting unit 102 can be achieved by use of the communication device 13. Further, all or some of the functions implemented by the receiving unit 101 and the transmitting unit 102, and the control unit 103 can be achieved by the processor 11 executing a program stored in the storage device 12. Further, the program can be stored in a storage medium. The storage medium with the program stored thereon may be a non-transitory computer readable medium. The non-transitory medium is not limited particularly but may be a storage medium such as a USB memory or a CD-ROM, for example.

The receiving unit 101 receives downlink signals. Further, the receiving unit 101 may also receive information and/or data transmitted through each downlink signal. Here, for example, the verb "receive" may also include the meaning of performing processing related to reception including at least one of the reception, demapping, demodulation, decoding, monitoring, and measurement of a radio signal. The downlink signal may include, for example, at least one of the PDCCH, the PDSCH, a downlink reference signal, the synchronization signal, the PBCH, and so on.

The receiving unit 101 monitors PDCCH candidates in a search space and detects DCI. The receiving unit 101 may receive downlink user data and/or control information (e.g., Medium Access Control Element (MAC CE), a Radio Resource Control (RRC) message, and the like) on an upper layer through a PDSCH scheduled by the DCI.

More specifically, the receiving unit 101 may receive system information (e.g., SIB1, SIB2, or SIB4).

Further, the receiving unit 101 may receive minimum reception level information (e.g., $Q_{rxlevmin,SingleRx}$ information and/or $Q_{rxlevmin,TwoRx}$ information) related to $Q_{rxlevmin}$ (a minimum reception level) for the terminal 10 (e.g., a single Rx terminal and/or a two Rx terminal) with a specific number of antennas in a specific cell, and/or minimum quality level information (e.g., $Q_{qualmin,SingleRx}$ information and/or $Q_{qualmin,TwoRx}$ information) related to $Q_{qualmin}$ (a minimum quality level) for the terminal with the specific number of antennas in the specific cell (e.g., FIGS. 6 to 8).

Further, the receiving unit 101 may receive minimum reception level information (e.g., $Q_{rxlevmin}$ information) related to $Q_{rxlevmin}$ (a minimum reception level) in a specific cell, and/or minimum quality level information (e.g., $Q_{qualmin}$ information) related to $Q_{qualmin}$ (a minimum quality level) in the specific cell (e.g., FIGS. 6 to 8, 10 to 12).

Further, the receiving unit 101 may receive information (e.g., $Q_{rxlevminoffset,SingleRx}$ information and/or $Q_{rxlevminoffset,TwoRx}$ information) related to $Q_{rxlevminoffset,Rx}$ as an offset to $Q_{rxlevmin}$ for the terminal 10 (e.g., a single Rx terminal and/or a two Rx terminal) with a specific number of antennas, and/or information (e.g., $Q_{qualminoffset,SingleRx}$ information and/or $Q_{qualminoffset,TwoRx}$ information) related to $Q_{qualminoffset,Rx}$ as an offset to $Q_{qualmin}$ for the terminal 10 with the specific number of antennas (e.g., FIGS. 10 to 12).

The transmitting unit 102 transmits uplink signals. Further, the transmitting unit 102 may also transmit information and/or data to be transmitted through each uplink signal. Here, for example, the verb "transmit" may also include the meaning of performing processing related to transmission including at least one of encoding, modulation, mapping, and transmission of a radio signal. The uplink signals may include, for example, at least one of an uplink shared channel (e.g., a Physical Uplink Shared channel: PUSCH), a random access preamble (e.g., a Physical Random Access Channel (PRACH)), an uplink reference signal, and so on.

The transmitting unit 102 may transmit uplink user data and/or control information (e.g., MAC CE, an RRC message, and the like) on an upper layer through a PUSCH scheduled by use of the DCI received by the receiving unit 101.

The control unit 103 performs various controls in the terminal 10. More specifically, the control unit 103 controls access of the terminal 10 of a specific type (e.g., a RedCap terminal) and/or the terminal 10 with a specific number of antennas (e.g., a single Rx terminal and/or a two Rx terminal) to a specific cell. Further, the control unit 103 controls cell selection/reselection in the terminal 10 of the specific type and/or the terminal 10 with the specific number of antennas.

Further, the control unit 103 may determine whether or not the access to the specific cell is barred, based on first access information (e.g., RedCap access information) related to the access of the terminal 10 of the specific type, and/or second access information (e.g., single Rx access information and/or two Rx access information) related to the access of the terminal 10 with the specific number of antennas.

Further, the control unit 103 may determine whether or not the access to the specific cell is barred, based on whether or not the first access information (e.g., RedCap access information) is included in system information received by the receiving unit 101, and/or whether or not the second access information (e.g., single Rx access information and/or two Rx access information) is included in the system information (e.g., FIG. 3).

Further, the control unit 103 may determine whether or not the access to the specific cell is barred, based on whether or not the terminal 10 is the terminal 10 of the specific type (e.g., a RedCap terminal), and/or whether or not the terminal 10 is the terminal 10 with the specific number of antennas (e.g., a single Rx terminal and/or two Rx terminal) (e.g., FIG. 3).

Further, in a case where the terminal 10 is the terminal 10 of the specific type (e.g., a RedCap terminal) and the first access information (e.g., RedCap access information) is not included in the system information, the control unit 103 may determine that the access of the terminal 10 to the specific cell is barred (e.g., FIG. 3).

Further, in a case where the terminal 10 is the terminal 10 of the specific type (e.g., a RedCap terminal) and the first access information (e.g., RedCap access information) is included in the system information, the control unit 103 may determine whether or not the access to the specific cell is barred, based on whether or not the terminal 10 is the terminal 10 with the specific number of antennas (e.g., a single Rx access terminal or a two Rx terminal) and whether or not the second access information (e.g., single Rx access information) is included in the system information (e.g., FIG. 3).

For example, in a case where the terminal 10 is a RedCap terminal, RedCap access information is included in the system information, the terminal 10 is a single Rx terminal, and single Rx access information is not included in the system information, the control unit 103 may determine that the access of the terminal 10 to the specific cell is barred (e.g., FIG. 3). In the meantime, in a case where the terminal 10 is a single Rx terminal and the single Rx access information is included in the system information, the control unit 103 may evaluate the specific cell based on a given criterion and camp on the specific cell based on the evaluation result.

Further, the control unit 103 controls cell selection and/or cell reselection based on Srxlev (a reception level parameter) derived based on minimum reception level information (e.g., $Q_{rxlevmin,SingleRx}$ information or $Q_{rxlevmin,TwoRx}$ information) for the terminal 10 with the specific number of antennas, and Squal (a quality level parameter) derived based on minimum quality level information (e.g., $Q_{qualmin,SingleRx}$ information or $Q_{qualmin,TwoRx}$ information) for the terminal 10 with the specific number of antennas (e.g., FIG. 5).

Further, in a case where the terminal 10 is the terminal 10 with the specific number of antennas (e.g., a single Rx access terminal or a two Rx terminal), the control unit 103 may derive Srxlev based on minimum reception level information (e.g., $Q_{rxlevmin,SingleRx}$ information or $Q_{rxlevmin,TwoRx}$ information) for the terminal 10 with the specific number of antennas, and/or derive Squal based on minimum quality level information (e.g., $Q_{qualmin,SingleRx}$ information or $Q_{qualmin,TwoRx}$ information) for the terminal 10 with the specific number of antennas (e.g., FIG. 5). Thus, the control unit 103 may derive Srxlev and/or Squal based on whether the terminal 10 is the terminal 10 with the specific number of antennas.

Further, in a case where the access of the terminal 10 of the specific type (e.g., a RedCap terminal) to a specific cell is allowed, and/or the access of the terminal 10 with the specific number of antennas (e.g., a single Rx terminal or a two Rx terminal) to the specific cell is allowed, the control unit 103 may derive Srxlev based on minimum reception level information (e.g., $Q_{rxlevmin,SingleRx}$ information or $Q_{rxlevmin,TwoRx}$ information) for the terminal 10 with the specific number of antennas, and/or derive Squal based on minimum quality level information (e.g., $Q_{qualmin,SingleRx}$ information or $Q_{qualmin,TwoRx}$ information) for the terminal 10 with the specific number of antennas (e.g., FIG. 5).

Further, the control unit 103 may control cell selection and/or cell reselection based on Srxlev derived based on $Q_{rxlevmin}$ derived based on $Q_{rxlevmin}$ information and $Q_{rxlevminoffset,Rx}$ as an offset to $Q_{rxlevmin}$ for the terminal 10 with the specific number of antennas, and/or Squal derived based on $Q_{qualmin}$ derived based on $Q_{qualmin}$ information and $Q_{qualminoffset,Rx}$ as an offset to $Q_{qualmin}$ for the terminal 10 with the specific number of antennas (e.g., FIG. 9).

$Q_{rxlevminoffset,Rx}$ and/or $Q_{qualminoffset,Rx}$ may be values determined in advance. Alternatively, the control unit 103 may derive $Q_{rxlevminoffset,Rx}$ based on $Q_{rxlevminoffset,Rx}$ information and $Q_{qualminoffset,Rx}$ based on $Q_{qualminoffset,Rx}$ information.

Base Station

Figure 15:
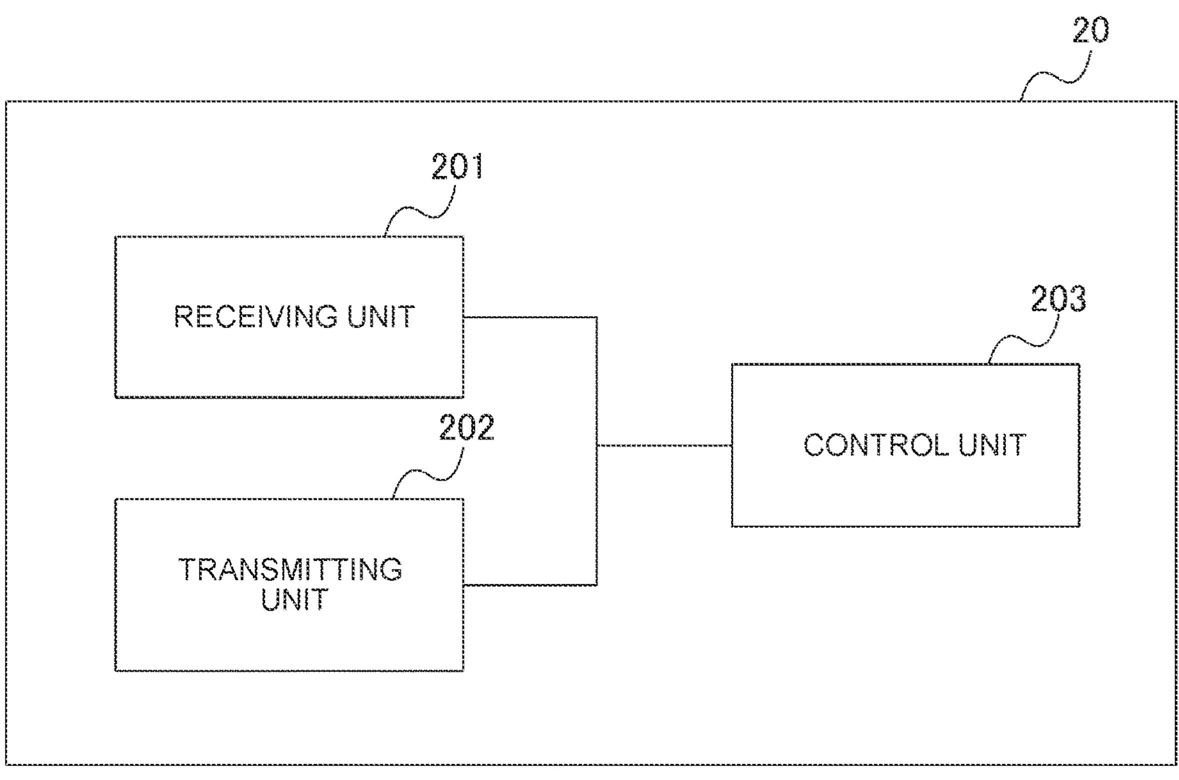
FIG. 15 is a diagram illustrating an example of the functional block configuration of a base station according to the present embodiment.

FIG. 15 is a diagram illustrating an example of the functional block configuration of the base station according to the present embodiment. As illustrated in FIG. 15, the base station 20 includes a receiving unit 201, a transmitting unit 202, and a control unit 203.

All or some of the functions implemented by the receiving unit 201 and the transmitting unit 202 can be achieved by use of the communication device 13. Further, all or some of the functions implemented by the receiving unit 201 and the transmitting unit 202, and the control unit 203 can be achieved by the processor 11 executing a program stored in the storage device 12. Further, the program can be stored in a storage medium. The storage medium with the program stored thereon may be a non-transitory computer readable medium. The non-transitory medium is not limited particularly but may be a storage medium such as a USB memory or a CD-ROM, for example.

The receiving unit 201 receives the above-mentioned uplink signals. Further, the receiving unit 201 may also receive information and/or data transmitted through each of the above-mentioned uplink signals.

The transmitting unit 202 transmits the above-mentioned downlink signals. Further, the transmitting unit 202 may also transmit information and/or data to be transmitted through each of the above-mentioned downlink signals. More specifically, the transmitting unit 202 may transmit system information (e.g., SIB1, SIB2, or SIB4). Further, the transmitting unit 202 may transmit minimum reception level information (e.g., $Q_{rxlevmin,SingleRx}$ information or $Q_{rxlevmin,TwoRx}$ information) and minimum quality level information (e.g., $Q_{qualmin,SingleRx}$ information or $Q_{qualmin,TwoRx}$ information) for the terminal 10 with the specific number of antennas (e.g., FIGS. 6 to 8). Further, the transmitting unit 202 may transmit the $Q_{rxlevmin}$ information and/or the $Q_{qualmin}$ information (e.g., FIGS. 6 to 8, 10 to 12). Further, the transmitting unit 202 may transmit the $Q_{rxlevminoffset,Rx}$ information and/or the $Q_{qualminoffset,Rx}$ information (e.g., FIGS. 10 to 12).

The control unit 203 performs various controls in the base station 20. The control unit 203 controls access of the terminal 10 of the specific type and/or the terminal 10 with the specific number of antennas to a specific cell. Further, the control unit 203 controls cell selection/reselection of the terminal 10 of the specific type and/or the terminal 10 with the specific number of antennas.

Other Embodiments

Various signals, information, and parameters in the aforementioned embodiment may be signaled in any layer. In other words, the various signals, information, and parameters mentioned above may be also replaced with signals, information, and parameters in any layer such as the upper layer (for example, a Non Access Stratum (NAS) layer, an RRC layer, a MAC layer, or the like) or the lower layer (for example, a physical layer). Further, given information is not limited to be explicitly informed and may also be implicitly informed (for example, by not informing the information or using any other information).

Further, the names of various signals, information, parameters, IE, channels, time units, and frequency units are just illustrative examples in the aforementioned embodiment, and the names may be replaced with other names. For example, each slot may be any other name as long as it is a time unit having a given number of symbols. Further, RB may be any other name as long as it is a frequency unit having a given number of subcarriers.

Further, the applications of the terminal 10 in the aforementioned embodiment (for example, for RedCap, IoT, and the like) are not limited to those described herein, and the terminal 10 may also be used for any other purpose (for example, for eMBB, URLLC, Device-to-Device (D2D), Vehicle-to-Everything(V2X), or the like) as long as it has similar functions. Further, the format of various information is not limited to that in the aforementioned embodiment, and it may be changed accordingly such as to bit representation (0 or 1), Boolean (true or false), integer values, or characters. Further, the singular and the plural in the aforementioned embodiment may be mutually changed.

The embodiment described above is to facilitate the understanding of this disclosure, and it is not intended to limit the interpretation of this disclosure. The flowchart or the sequence described in the embodiment, and the alignment and arrangement of respective elements, indexes, conditions, and the like included in the embodiment are not limited to those described and can be changed accordingly. Further, at least some of components described in the aforementioned embodiment can be partially replaced or combined.

Note that, in FIG. 5, in a case where the terminal 10 is a single Rx terminal, the $Q_{rxlevmin,SingleRx}$ information is included in SIB1, SIB2, and SIB4, and RedCap access information and single Rx access information in SIB1 both indicate permission of the access to the specific cell (e.g., they are set to true), $Q_{rxlevmin}$ is derived based on the $Q_{rxlevmin,SingleRx}$ information (e.g., "q-RxLevMinSingleRx"). However, the present invention is not limited to this. In a case where the access of the terminal 10 to the cell is determined to be allowed (that is, the cell is not barred to the terminal 10) based on the RedCap access information and/or the single Rx access information in SIB1, $Q_{rxlevmin}$ may be derived based on the $Q_{rxlevmin,SingleRx}$ information (e.g., "q-RxLevMinSingleRx").

Further, in FIG. 5, in a case where the terminal 10 is a single Rx terminal, the $Q_{qualmin,SingleRx}$ information is included in SIB1, SIB2 and SIB4, and RedCap access information and single Rx access information in SIB1 both indicate permission of the access to the specific cell (e.g., they are set to true), $Q_{qualmin}$ is derived based on the $Q_{qualmin,SingleRx}$ information (e.g., "q-QualMinSingleRx"). However, the present invention is not limited to this. In a case where the access of the terminal 10 to the cell is determined to be allowed (that is, the cell is not barred to the terminal 10) based on the RedCap access information and/or the single Rx access information in SIB1, $Q_{qualmin}$ may be derived based on the $Q_{qualmin,SingleRx}$ information (e.g., "q-QualMinSingleRx").

The invention claimed is:

1. A terminal comprising:

a memory storing a program; and at least one processor that, by executing the program stored in the memory, is configured to:

receive system information;

determine whether or not a cell is barred based on first information and a number of receivers of the terminal, the first information being included in the system information and indicating that whether or not the cell is barred for a terminal with a single receiver; and in a case where the cell is not barred for the terminal with the single receiver, perform measurement for cell selection or cell reselection based on a reception level value, the reception level value being derived based on second information used for indicating a minimum reception level in the cell and a value for the terminal with the single receiver to the minimum reception level.

2. The terminal according to claim 1, wherein the at least one processor, by executing the program stored in the memory, is further configured to:

in the case where the cell is not barred for the terminal with the single receiver, perform the measurement for the cell selection or the cell reselection based on a quality value, the quality value being derived based on information used for indicating a minimum quality level in the cell and a value for the terminal with the single receiver to the minimum quality level.

3. The terminal according to claim 1, wherein the system information is system information block 1 (SIB1).

4. The terminal according to claim 1, wherein the terminal with the single receiver is a Reduced Capability (RedCap) terminal.

5. The terminal according to claim 1, wherein the at least one processor, by executing the program stored in the memory, is further configured to:

determine whether or not the cell is barred based on the first information and the number of receivers of the terminal in a case where third information is included in the system information, the third information being used for indicating that a reduced capability (RedCap) terminal is allowed to camp on the cell.

6. A base station comprising:

a memory storing a program; and at least one processor that, by executing the program stored in the memory, is configured to:

transmit system information including first information indicating that whether or not a cell is barred for a terminal with a single receiver, control the terminal to determine whether or not the cell is barred based on the first information and a number of receivers of the terminal; and in a case where the cell is not barred for the terminal with the single receiver, control the terminal to perform measurement forcell selection or cell reselection based on a reception level value, the reception level value being derived based on second information used for indicating a minimum reception level in the cell and a value for the terminal with the single receiver to the minimum reception level.

7. The base station according to claim 6, wherein the at least one processor, by executing the program stored in the memory, is further configured to:

in the case where the cell is not barred for the terminal with the single receiver, control the terminal to perform the measurement for the cell selection or the cell reselection based on a quality value, the quality value being derived based on information used for indicating a minimum quality level in the cell and a value for the terminal with the single receiver to the minimum quality level.

8. The base station according to claim 6, wherein the system information is system information block 1 (SIB1).

9. The base station according to claim 6, wherein the terminal with the single receiver is a Reduced Capability (RedCap) terminal.

10. The base station according to claim 6, wherein the at least one processor, by executing the program stored in the memory, is further configured to:

transmit the system information including third information used for indicating that a reduced capability (RedCap) terminal is allowed to camp on the cell; and control the terminal to determine whether or not the cell is barred based on the first information and the number of receivers of the terminal in a case where the third information is included in the system information.

11. A wireless communication method for a terminal, the wireless communication method comprising:

receiving system information;

determining whether or not a cell is barred based on first information and a number of receivers of the terminal, the first information being included in the system information and indicating that whether or not the cell is barred for a terminal with a single receiver;

in a case where the cell is not barred for the terminal with the single receiver, performing measurement for cell selection or cell reselection based on a reception level value, the reception level value being derived based on second information used for indicating a minimum reception level in the cell and a value for the terminal with the single receiver to the minimum reception level.

12. The wireless communication method according to claim 11, further comprising:

in the case where the cell is not barred for the terminal with the single receiver, performing the measurement for the cell selection or the cell reselection based on a quality value, the quality value being derived based on information used for indicating a minimum quality level in the cell and a value for the terminal with the single receiver to the minimum quality level.

13. The communication method according to claim 11, wherein the system information is system information block 1 (SIB1).

14. The communication method according to claim 11, wherein the terminal with the single receiver is a Reduced Capability (RedCap) terminal.

15. The communication method according to claim 11, further comprising:

determining whether or not the cell is barred based on the first information and the number of receivers of the terminal in a case where third information is included in the system information, the third information being used for indicating that a reduced capability (RedCap) terminal is allowed to camp on the cell.

* * * * *